US012303917B2

(12) United States Patent
Mercado Alvarado

(10) Patent No.: US 12,303,917 B2
(45) Date of Patent: May 20, 2025

(54) SUBSTANCE SEPARATOR SYSTEM DRIVEN BY A SUBMERSIBLE ACTUATOR

(71) Applicant: Adalberto Mercado Alvarado, Bayamon, PR (US)

(72) Inventor: Adalberto Mercado Alvarado, Bayamon, PR (US)

( * ) Notice: Subject to any disclaimer, the term of this patent is extended or adjusted under 35 U.S.C. 154(b) by 923 days.

(21) Appl. No.: 17/471,546

(22) Filed: Sep. 10, 2021

(65) Prior Publication Data
US 2021/0402416 A1   Dec. 30, 2021

Related U.S. Application Data

(63) Continuation-in-part of application No. 17/164,367, filed on Feb. 1, 2021, now abandoned, which is a continuation-in-part of application No. 16/906,882, filed on Jun. 19, 2020, now Pat. No. 11,766,644, which is a continuation-in-part of application No.
(Continued)

(51) Int. Cl.
| | |
|---|---|
| *B04B 9/02* | (2006.01) |
| *B04B 1/08* | (2006.01) |
| *B04B 7/02* | (2006.01) |
| *B04B 11/02* | (2006.01) |
| *C02F 1/38* | (2023.01) |
| *B01F 23/50* | (2022.01) |
| *B01F 23/53* | (2022.01) |
| *B01F 27/91* | (2022.01) |
| *B01F 35/32* | (2022.01) |
| *B01F 101/00* | (2022.01) |

(Continued)

(52) U.S. Cl.
CPC .............. *B04B 9/02* (2013.01); *B04B 1/08* (2013.01); *B04B 7/02* (2013.01); *B04B 11/02* (2013.01); *C02F 1/38* (2013.01); *B01F 23/53* (2022.01); *B01F 23/56* (2022.01); *B01F 27/91* (2022.01); *B01F 35/3204* (2022.01); *B01F 2101/2204* (2022.01); *B01F 2101/2805* (2022.01); *C02F 11/127* (2013.01); *C02F 2101/32* (2013.01)

(58) Field of Classification Search
CPC .......... C02F 1/38; C02F 2101/32; B04B 7/02; B04B 11/02; B04B 1/08
See application file for complete search history.

(56) References Cited

U.S. PATENT DOCUMENTS 2,394,015 A * 2/1946 August ................. B04B 11/02
494/56
2,837,273 A * 6/1958 Sullivan ................. B04B 1/08
494/70

(Continued)

*Primary Examiner* — Marc C Howell
(74) *Attorney, Agent, or Firm* — Eugenio J. Torres-Oyola; Victor M. Rodriguez-Reyes; Rafael Rodriguez-Muriel

(57) ABSTRACT

A submersible substance separator system having an outer chamber, a top cover plate, an upper cup, a disc stack separator; a middle cup, a submersible actuator, a lower cup, and an interior chamber within the outer chamber; in which one section of the disc stack separator is configured to lead, in response to centrifugal forces, a first separated substance into the upper cup and subsequently into the outer chamber until it reaches a chamber outlet corresponding to the outer chamber; and wherein another section of the disc stack separator is configured to release, in response to centrifugal forces, a second separated substance into the interior chamber until it reaches a chamber outlet corresponding to the interior chamber.

29 Claims, 45 Drawing Sheets

Related U.S. Application Data

15/787,758, filed on Oct. 19, 2017, now Pat. No. 10,766,011.

(51) Int. Cl.
    *C02F 11/127*     (2019.01)
    *C02F 101/32*     (2006.01)

(56) References Cited

U.S. PATENT DOCUMENTS

| | | | |
|---|---|---|---|
| 3,728,245 A * | 4/1973 | Preis | C02F 1/46104 |
| | | | 204/278.5 |
| 3,766,033 A * | 10/1973 | Preis | C02F 1/461 |
| | | | 205/756 |
| 2004/0132601 A1* | 7/2004 | Peacocke | B03B 5/32 |
| | | | 494/80 |
| 2010/0240513 A1* | 9/2010 | McAlister | B04B 7/04 |
| | | | 494/60 |
| 2011/0301013 A1* | 12/2011 | Feng | B04B 11/05 |
| | | | 494/47 |
| 2017/0043357 A1* | 2/2017 | Sherman | B04B 5/0442 |
| 2017/0066896 A1* | 3/2017 | Behrens | B03D 1/012 |
| 2019/0276338 A1* | 9/2019 | Wilson | B04B 5/10 |
| 2021/0122653 A1* | 4/2021 | Arguelles | C02F 1/36 |
| 2021/0402416 A1* | 12/2021 | Mercado Alvarado | B04B 7/02 |

\* cited by examiner

SUBSTANCE SEPARATOR SYSTEM DRIVEN BY A SUBMERSIBLE ACTUATOR

CROSS-REFERENCE TO RELATED APPLICATION

This application is a continuation-in-part of, and claims the benefit of priority to, U.S. patent application Ser. No. 17/164,367, filed on Feb. 1, 2021, entitled "Liquid Polymer or Chemical Activation System Using a Submersible Actuator", incorporated by reference in its entirety herein, which in turn is a continuation-in-part of U.S. patent application Ser. No. 16/906,882, filed on Jun. 16, 2020, entitled "Liquid Polymer or Chemical Activation System Using a Submersible Actuator", and incorporated by reference in its entirety herein, which in turn is a continuation-in-part of U.S. patent application Ser. No. 15/787,758, filed on Oct. 19, 2017, entitled "Liquid Polymer Activation System Using a Submersible Actuator" the contents of which are hereby incorporated by reference.

STATEMENT REGARDING FEDERALLY SPONSORED RESEARCH AND DEVELOPMENT

N/A

BACKGROUND OF THE INVENTION

Field of the Invention

The present invention relates to a structure built into a chamber including a liquid separator system mechanically driven by a submersible motor.

Discussion of the Background

Generally, mechanical blending systems are used in the separation of liquids from solids (and vice versa) on water treatment plants, waste-water treatment plants, pharmaceutical plants, food and beverage plants, diary, distillery, power plants, industrial plants and mining processing facilities.

Further, standard mechanical and non-mechanical blending systems are used as ancillary equipment of liquid/solid separation technologies and play an essential role in sludge dewatering industries. In fact, the separation in sludge dewatering industries will not take place without a polymer blending system. For example, the polymer blending system are used with the following sludge dewatering equipment:
Decanters
High speed centrifuges
Belt filter presses
Gravity Belt thickeners
Rotary Drum thickeners
Plate presses
Screw Presses
Primary and secondary thickeners
Market snapshot Standard mechanical and non-mechanical polymer blending systems use a single energy reaction chamber for dilution and activation of polymer. All of them depend on high inlet water pressure to get or maintain a constant blend if the inlet pressure is low; then the constant blend turns into variable blend. In variable blend systems the operator will follow two things that will increase consumption costs:
Increase polymer dosing pump capacity.
Decrease production to maintain process stability.

Standard mechanical polymer blending systems comprise an external motor, a water inlet, a polymer inlet, a mixing device, a mixing chamber reaction and a blend outlet. The minimum inlet pressure is 30-50 PSI wherein with a low water inlet pressure a poor blend is achieved.

The non-mechanical polymer blending systems comprise a water inlet, polymer inlet, mixing chamber reactor, static mixing device and blend outlet. The minimum inlet pressure is 60 PSI wherein with a low water inlet pressure a worst blend is achieved compared to the mechanical polymer blending system.

Therefore, there is a need for a mechanical blending system that provides a correct and constant blend if the inlet water feed pressure is under 35 PSI and 60 PSI for a non-mechanical blender. There is also a need for a liquid separator system mechanically driven by a submersible motor.

SUMMARY OF THE INVENTION

The present disclosure relates to a submersible substance separator system, comprising: an outer chamber having a first distal end and a second distal end, wherein each distal end is opposite to each other; wherein the first distal end of the outer chamber includes a top chamber flange; wherein the second distal end of the outer chamber includes a bottom chamber flange having one or more chamber outlets; a top cover plate connected to or secured to the top chamber flange on the first distal end of the outer chamber; an upper cup; a disc stack separator; a middle cup; a submersible actuator; and a lower cup; an interior chamber within the outer chamber; wherein at least one chamber outlet corresponds to the outer chamber and at least one chamber outlet corresponds to the interior chamber; wherein the top cover plate includes a solution inlet that is configured to receive a mixture of substances and to lead them into the disc stack separator; wherein the top cover plate is configured to fit over and enclose the upper cup; wherein the upper cup is configured to fit over and enclose at least a portion of the disc stack separator; wherein the disc stack separator includes an extended portion, a mid-section and a shaft coupling unit, and is configured to receive the one or more substances from the solution inlet; wherein the upper cup includes an opening that is configured to receive and accommodate the extended portion of the disc stack separator; wherein the extended portion includes one or more openings configured to release, in response to centrifugal forces within the disc stack separator, a first substance separated from the mixture of substances into the area covered by the top cover plate and subsequently into the outer chamber until it reaches the chamber outlet corresponding to the outer chamber, which is where the first separated substance exits the outer chamber; wherein the mid-section of the disc stack separator includes one or more openings configured to release, in response to centrifugal forces within the disc stack separator, a second substance separated from the mixture of substances into the upper cup and subsequently towards the interior chamber until it reaches the chamber outlet corresponding to the inner chamber, which is where the interior chamber; wherein the submersible actuator includes a top end, a bottom end and a shaft that is coupled to the disc stack separator via a shaft coupling unit; wherein the middle cup includes a central hollow tube perpendicularly attached to a top base and to a bottom base; wherein the top base and the bottom base include an opening configured to facilitate coupling between the shaft coupling unit and the shaft; wherein the bottom base of the middle cup is coupled or secured to the top end of the submersible actuator; and wherein the bottom end of the submersible actuator, in turn, is coupled or secured to the lower cup, which serves a base for the submersible actuator and holds it in place within the interior chamber.

To enable a better understanding of the objectives and features of the present invention, a brief description of the drawing below will be followed with a detailed description of the invention.

DETAILED DESCRIPTION OF THE INVENTION

The present disclosure discloses several exemplary embodiments of a liquid polymer or chemical activation system that uses a submersible actuator and has a plurality of blending zones or sections, as further described below.

FIGS. 1-17 show a liquid polymer or chemical activation system 1 that comprises a hollow chamber C having a first distal end DE1 and a second distal end DE2, wherein each distal end is opposite to each other. The first distal end DE1 of the hollow chamber C includes a top chamber flange 2 having one or more holes configured to receive one or more bolts, screws or fasteners S. Similarly, the second distal end DE2 of the hollow chamber C includes a bottom chamber flange 3 having one or more holes configured to receive one or more bolts, screws or fasteners S. The hollow chamber C may be circular in shape, as shown in FIGS. 1-9; but may have any other shape, as shown in FIGS. 10-17, where the chamber C has a squared shape.

Figure 1:
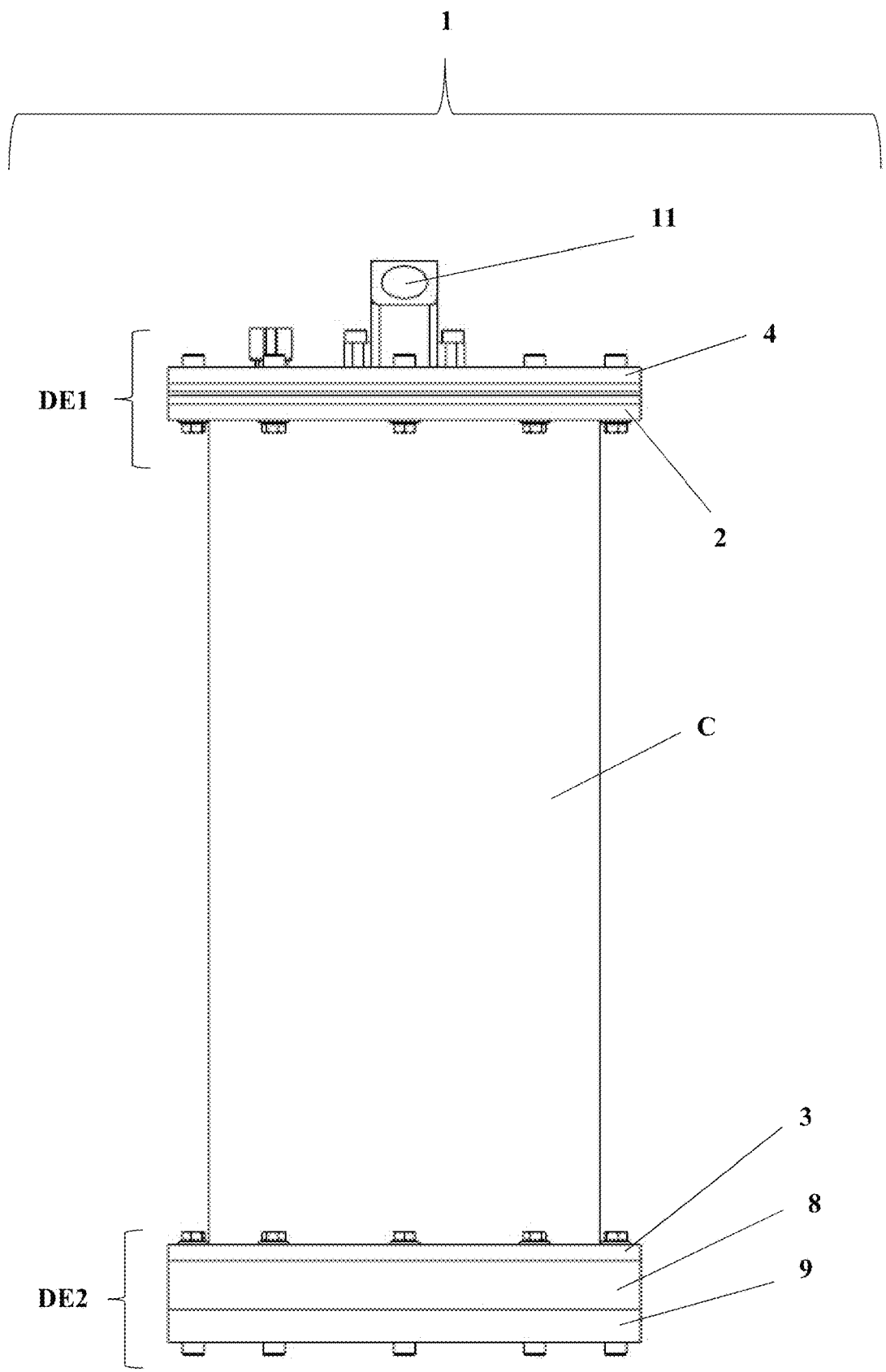
FIG. 1 shows the exterior components of a liquid polymer or chemical activation system that uses a submersible actuator, in accordance with the principles of the present invention.
Figure 2:
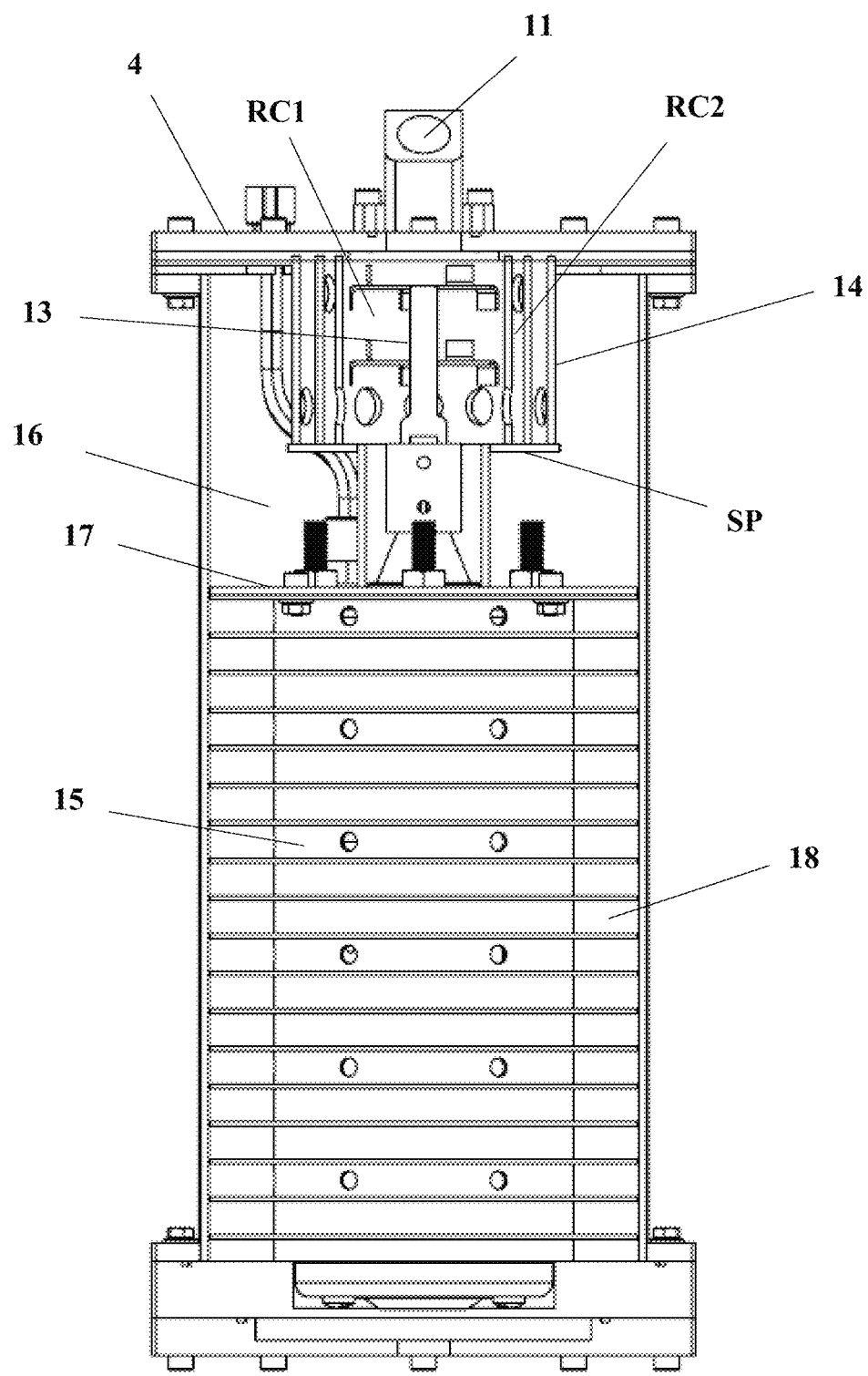
FIG. 2 shows the interior components of a liquid polymer or chemical activation system having a linear aging cup, in accordance with the principles of the present invention.
Figure 3:
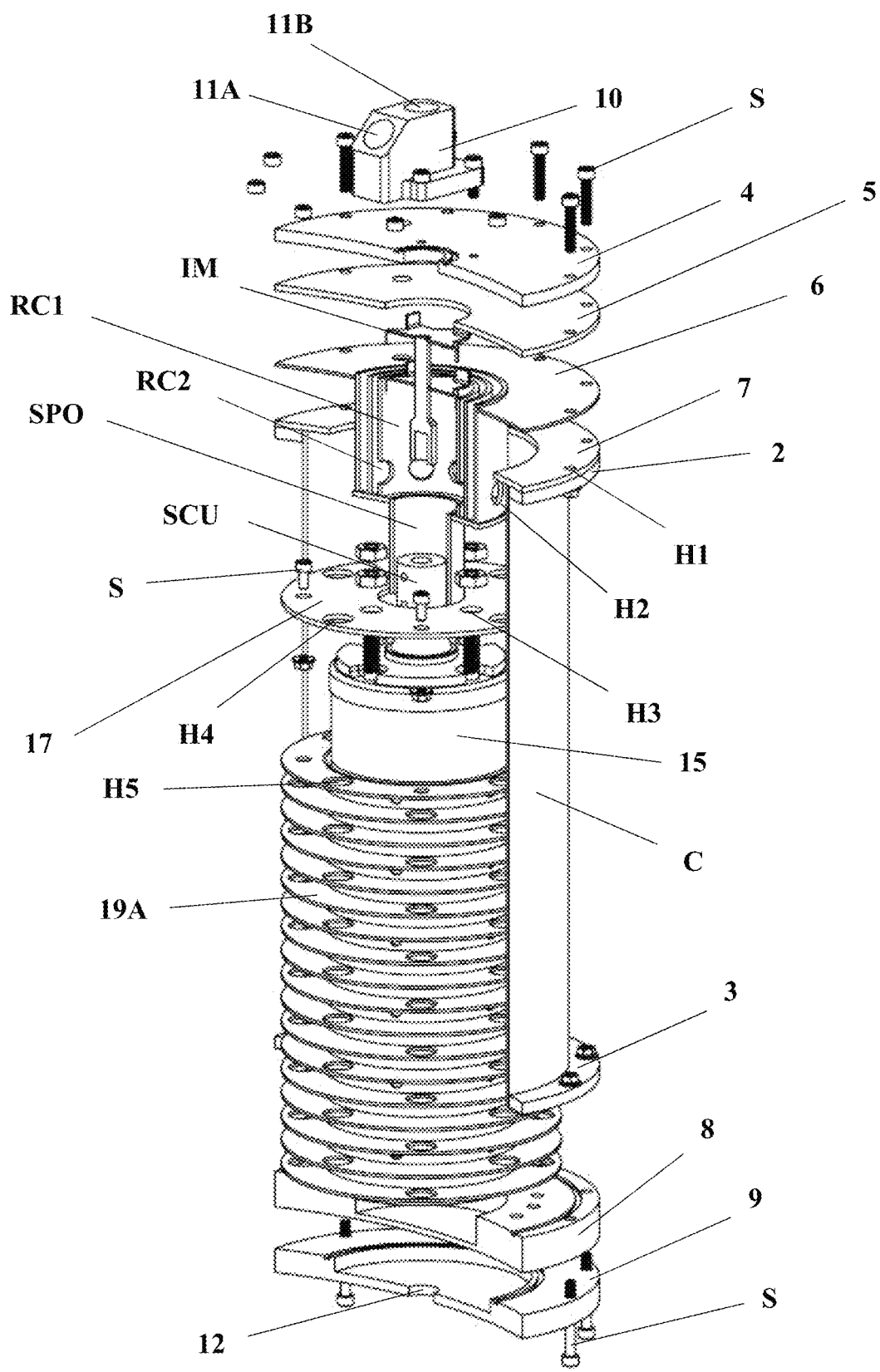
FIG. 3 shows an exploded view of the interior components of the liquid polymer or chemical activation system having a linear aging cup, in accordance with the principles of the present invention.

Additionally, as shown in FIGS. 2-3, the liquid polymer or chemical activation system 1 comprises a top cover plate 4, a first top gasket 5, a cup flange 6 and a second top gasket 7 connected to or secured to the top chamber flange 2 on the first distal end DE1 of the hollow chamber C via one or more bolts, screws or fasteners S. Each of the top cover plate 4, first top gasket 5, top cup flange 6, and second top gasket 7 has one or more holes H1 configured to receive the one or more bolts, screws or fasteners S. Furthermore, the one or more holes H1 on each of the previously mentioned individual elements (i.e., the top cover plate 4, the first top gasket 5, the top cup flange 6, and the second top gasket 7) are configured to align with each other and with the one or more holes on the top chamber flange 2, as shown in FIGS. 3, 5, 7, 9, 11, 13, 15 and 17. In this manner, the top cover plate 4, the first top gasket 5, the top cup flange 6, the second top gasket 7, and the top chamber flange 2 are tightly pressed against each other when secured via the one or more bolts, screws or fasteners S. Furthermore, as also shown in FIGS. 2-3, the liquid polymer or chemical activation system 1 further comprises a middle cover plate 8 and a bottom cover plate 9 secured to the bottom chamber flange 3 on the second distal end DE2 of the hollow chamber C via one or more bolts, screws or fasteners S. It should be noted that the middle plate 8 lies between the lower chamber flange 3 and the bottom cover plate 9. Moreover, each of the bottom cover plate 9 and middle plate 8 has one or more holes H1 configured to receive the one or more bolts, screws or fasteners S. Notably, the one or more holes H1 on each of the aforementioned individual elements (i.e., the bottom cover plate 9 and the middle plate 8) are configured to align with each other and with the one or more holes on the bottom chamber flange 3, as shown in FIGS. 3, 5, 7, 9, 11, 13, 15 and 17. In this manner, the bottom cover plate 9, middle plate 8 and bottom chamber flange 3 are tightly pressed against each other when secured via the one or more bolts, screws or fasteners S. Accordingly, the configuration of the liquid polymer or chemical activation system 1 creates a hollow space inside the chamber C that is flanked by the top cover plate 4 and the bottom cover plate 9.

As shown in FIGS. 1-17, the top cover plate 4 comprises a blending reactor 10 with at least one inlet 11 for receiving one or more substances, including, but not limited to, any liquid, solid particle or physical matter; and the bottom cover plate 9 comprises at least one outlet 12 for releasing the one or more substances. Moreover, as shown in FIG. 2, within the chamber C, the liquid polymer or chemical activation system 1 comprises an upper multistage mixing cup 14 comprising one or more retention cups RC configured to receive the one or more substances that were poured through the one or more inlet 11; at least one high shear mixer 13 for mixing the one or more substances in the multistage mixing cup 14; at least one submersible actuator 15 for actuating or rotating the high shear mixer 13; an intermediate blending section 16 for receiving the mixed one or more substances from the multistage mixing cup 14; a cup base flange 17 having one or more holes and a support platform for supporting one end of the multistage mixing cup 14; and a lower multistage aging cup 18 for further mixing of the one or more substances.

Figure 4:
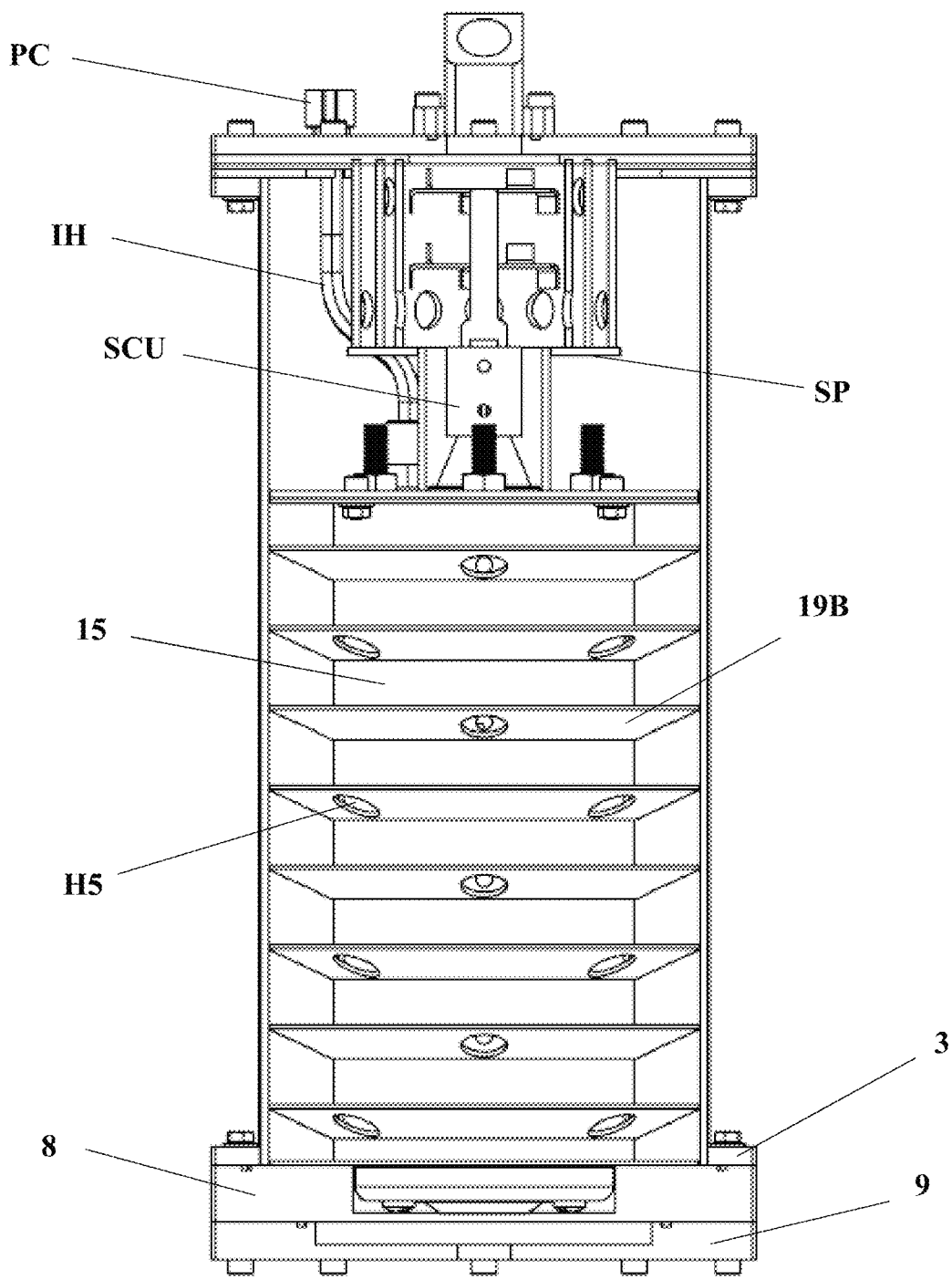
FIG. 4 shows the interior components of a liquid polymer or chemical activation system having a concave aging cup, in accordance with the principles of the present invention.
Figure 5:
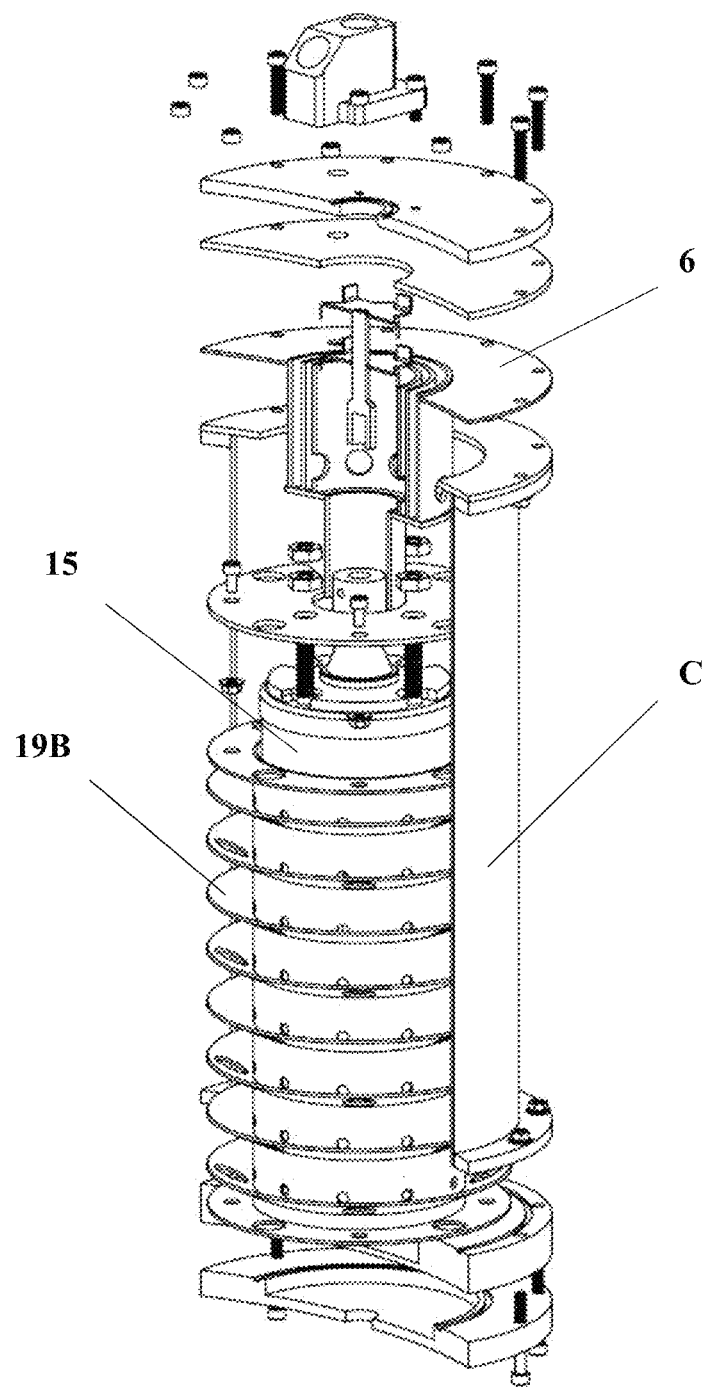
FIG. 5 shows an exploded view of the interior components of the liquid or chemical activation system having a concave aging cup, in accordance with the principles of the present invention.
Figure 6:
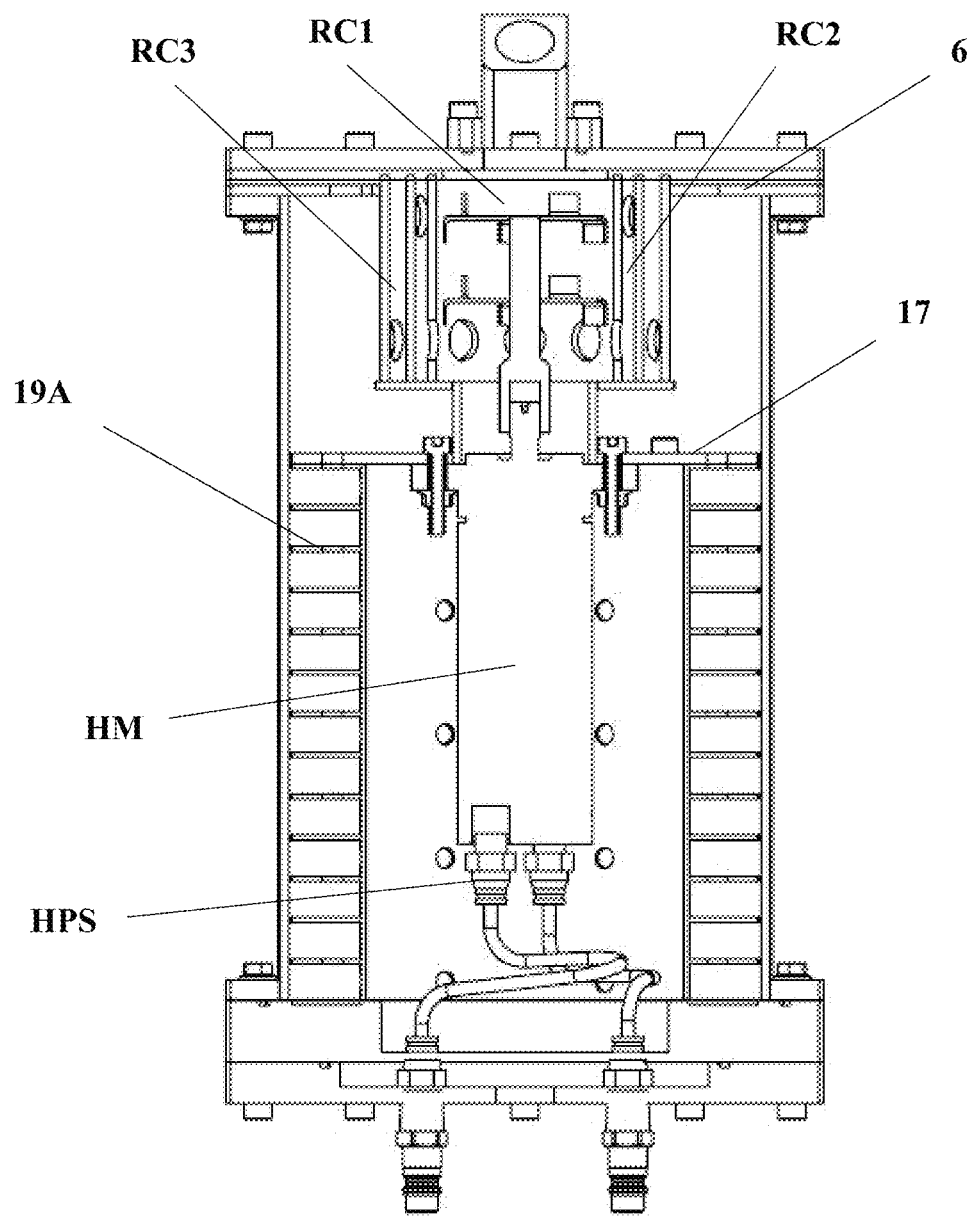
FIG. 6 shows the interior components of a liquid polymer or chemical activation system having a submersible pneumatic or hydraulic actuator with portions of the linear aging cup removed to better show the pneumatic or hydraulic actuator, in accordance with the principles of the present invention.
Figure 7:
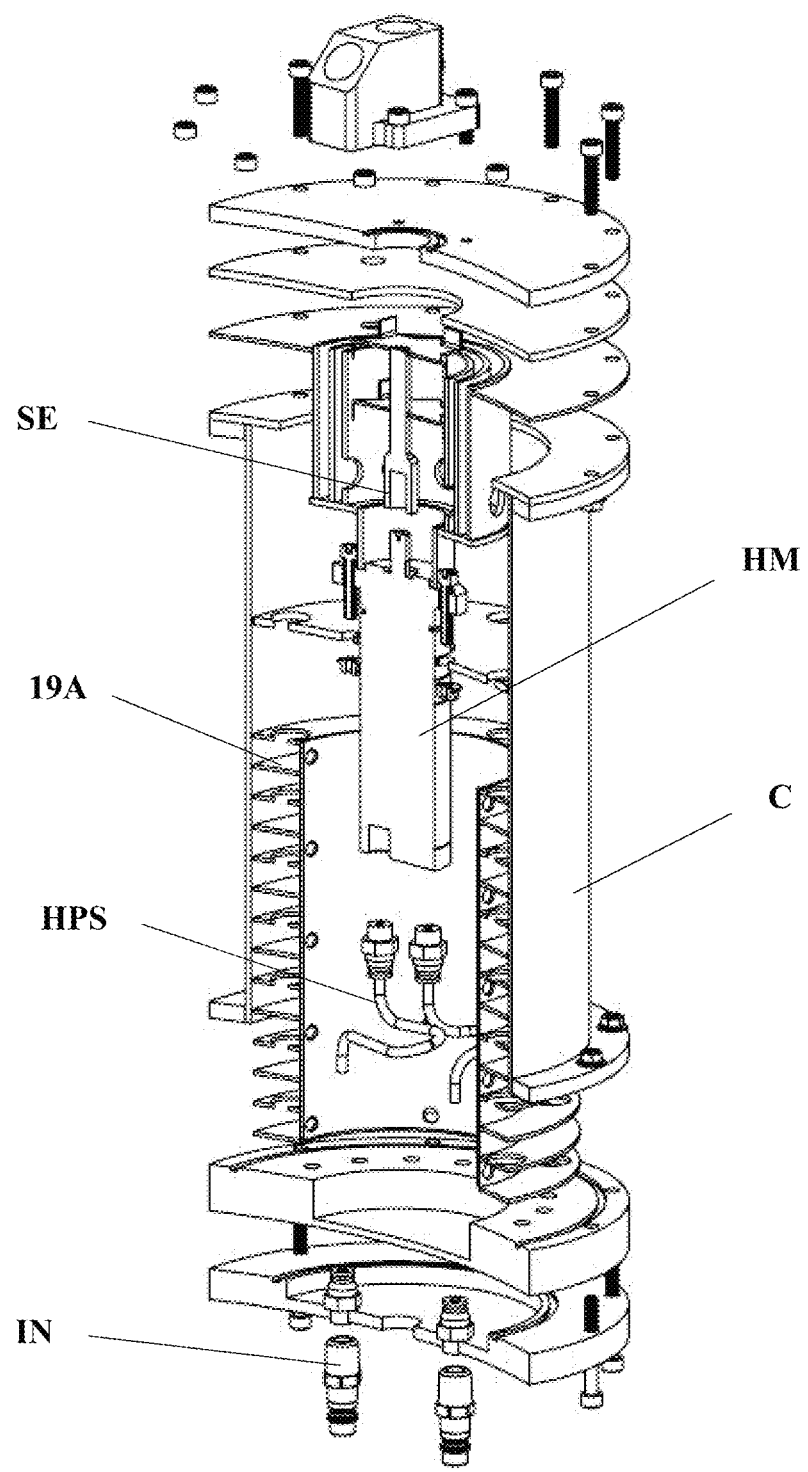
FIG. 7 shows an exploded view of the interior components of the liquid polymer or chemical activation system having a submersible pneumatic or hydraulic actuator and with portions of the linear aging cup removed to better show the pneumatic or hydraulic actuator, in accordance with the principles of the present invention.
Figure 8:
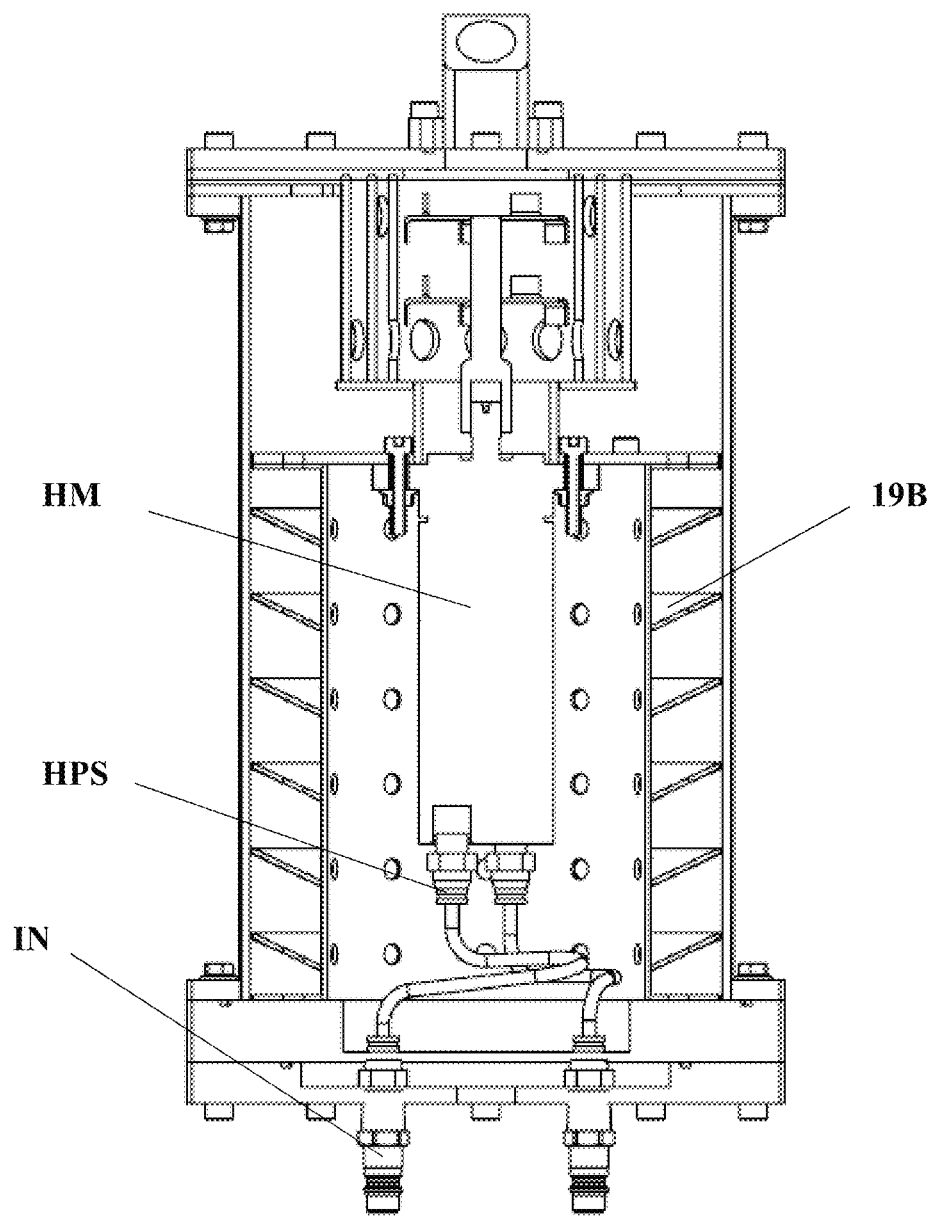
FIG. 8 shows the interior components of a liquid polymer or chemical activation system having a submersible pneumatic or hydraulic actuator with portions of the concave aging cup removed to better show the pneumatic or hydraulic actuator, in accordance with the principles of the present invention.
Figure 9:
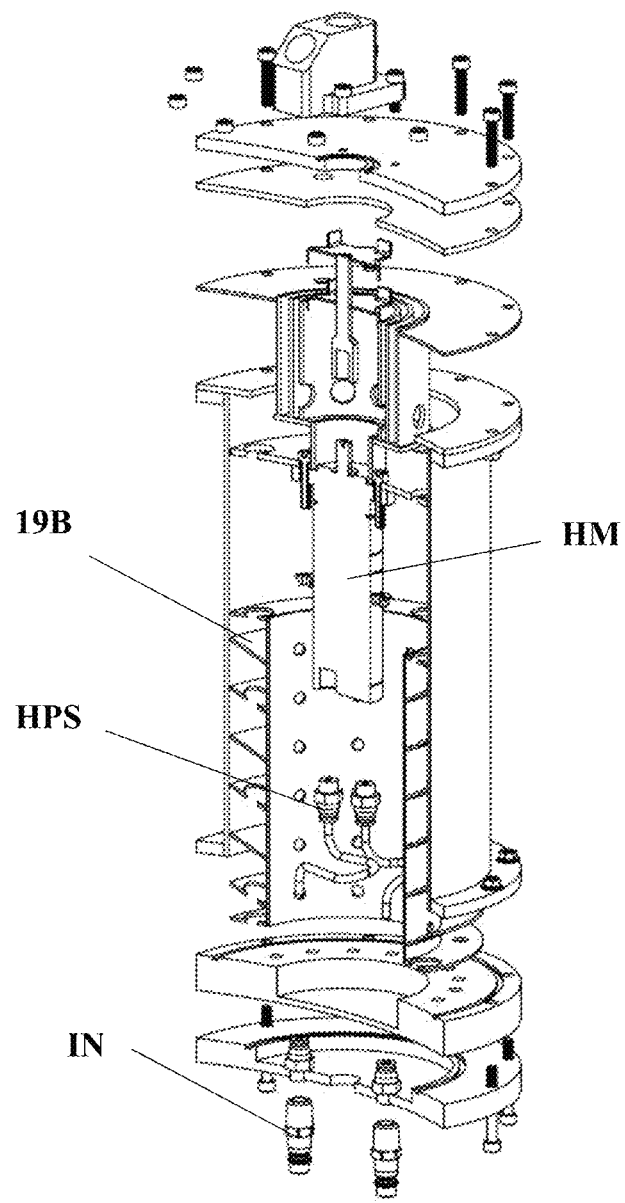
FIG. 9 shows an exploded view of the interior components of the liquid polymer or chemical activation system having a submersible pneumatic or hydraulic actuator with portions of the concave aging cup removed to better show the pneumatic or hydraulic actuator, in accordance with the principles of the present invention.
Figure 10:
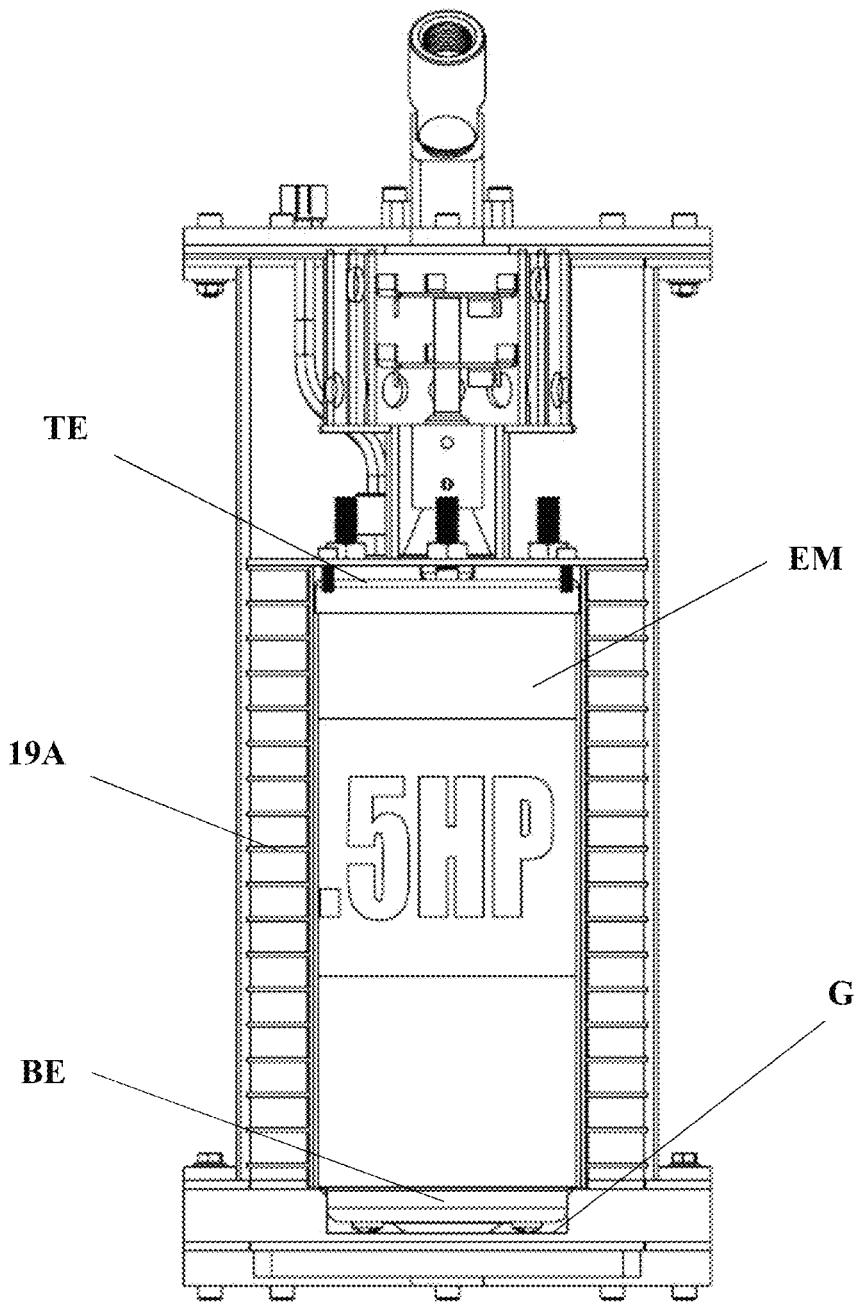
FIG. 10 shows the interior components of a liquid polymer or chemical system having a submersible electric actuator with portions of the linear aging cup removed to better show the electric actuator, in accordance with the principles of the present invention.
Figure 11:
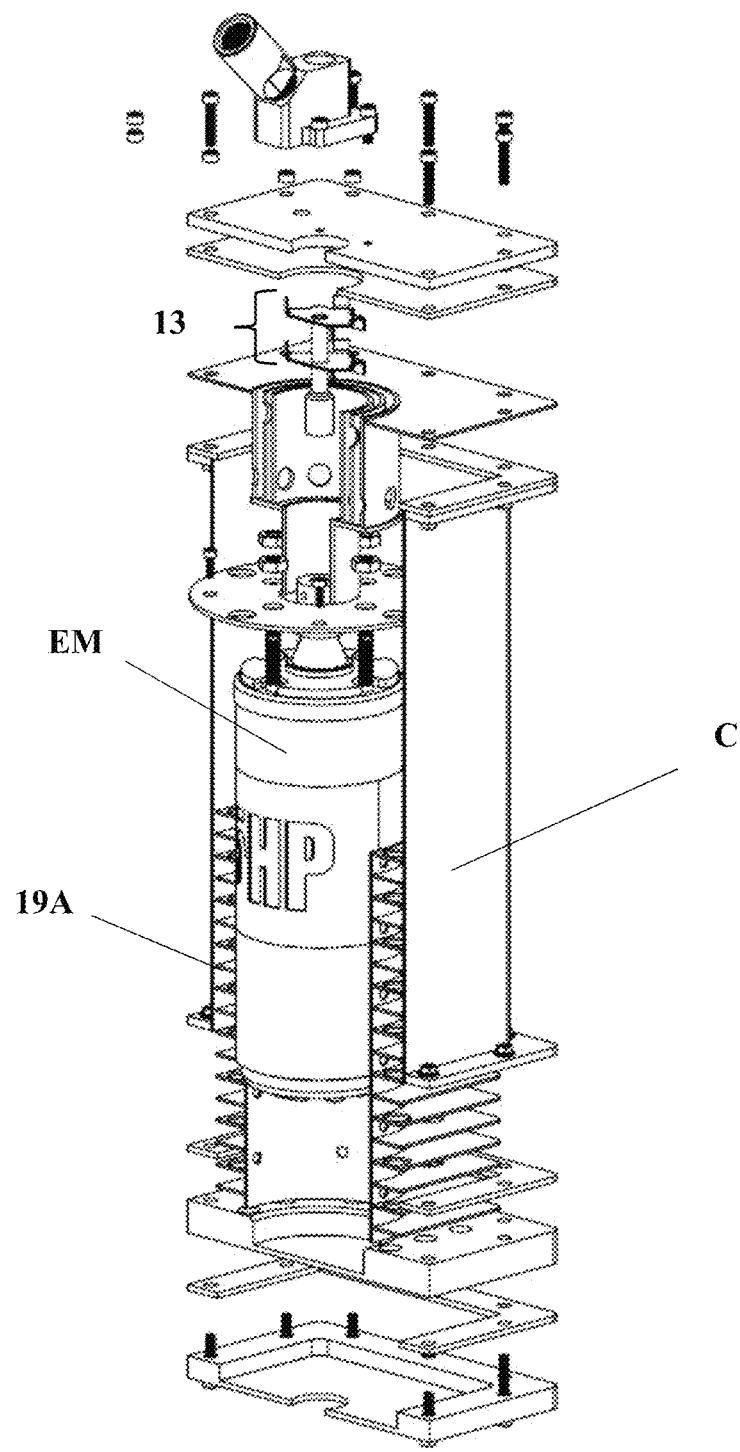
FIG. 11 shows an exploded view of the interior components of the liquid polymer or chemical activation system having a submersible electric actuator with portions of the linear aging cup removed to better show the electric actuator, in accordance with the principles of the present invention.
Figure 12:
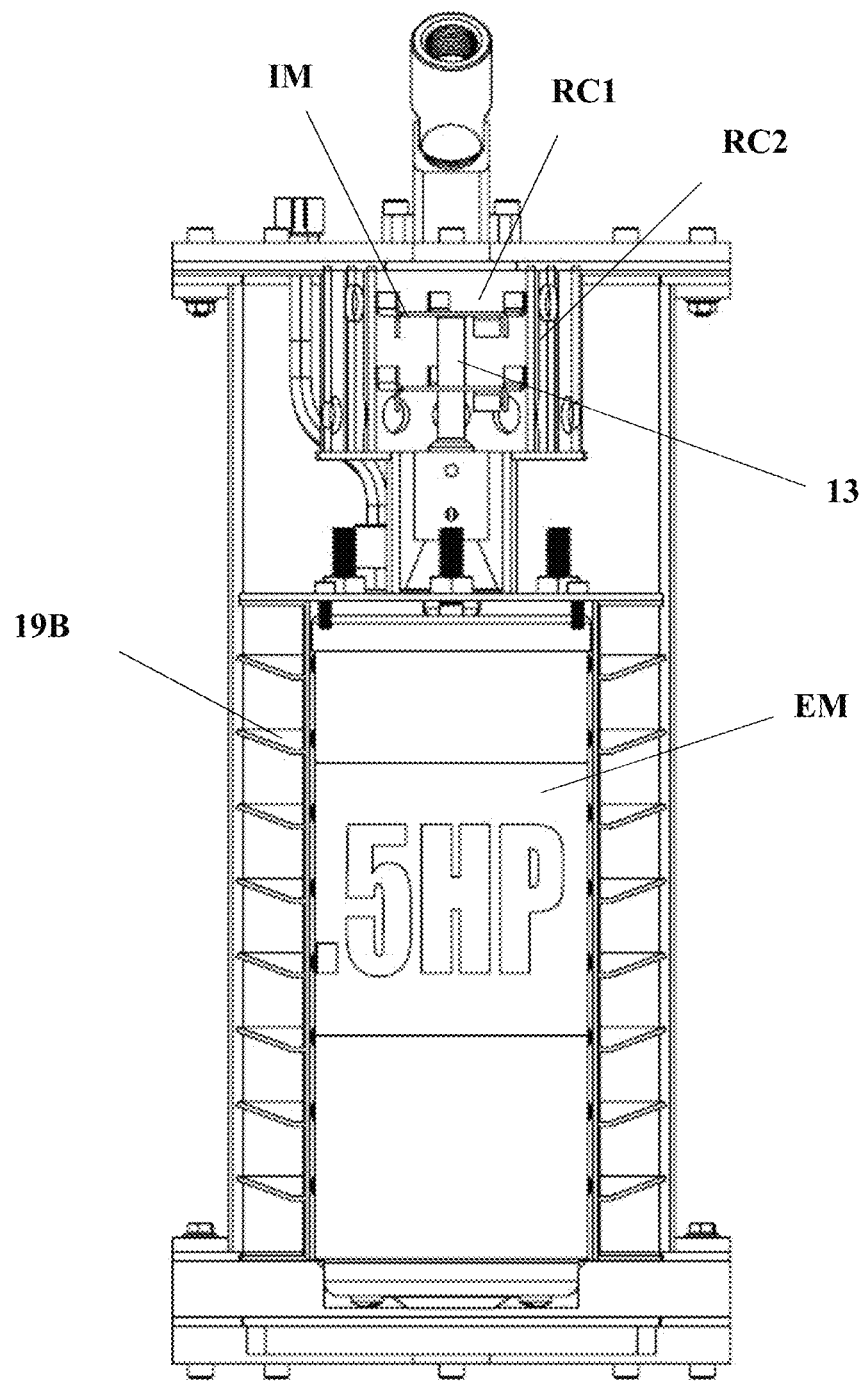
FIG. 12 shows the interior components of a liquid polymer or chemical activation system having a submersible electric actuator and with portions of the concave aging cup removed to better show the electric actuator, in accordance with the principles of the present invention.
Figure 13:
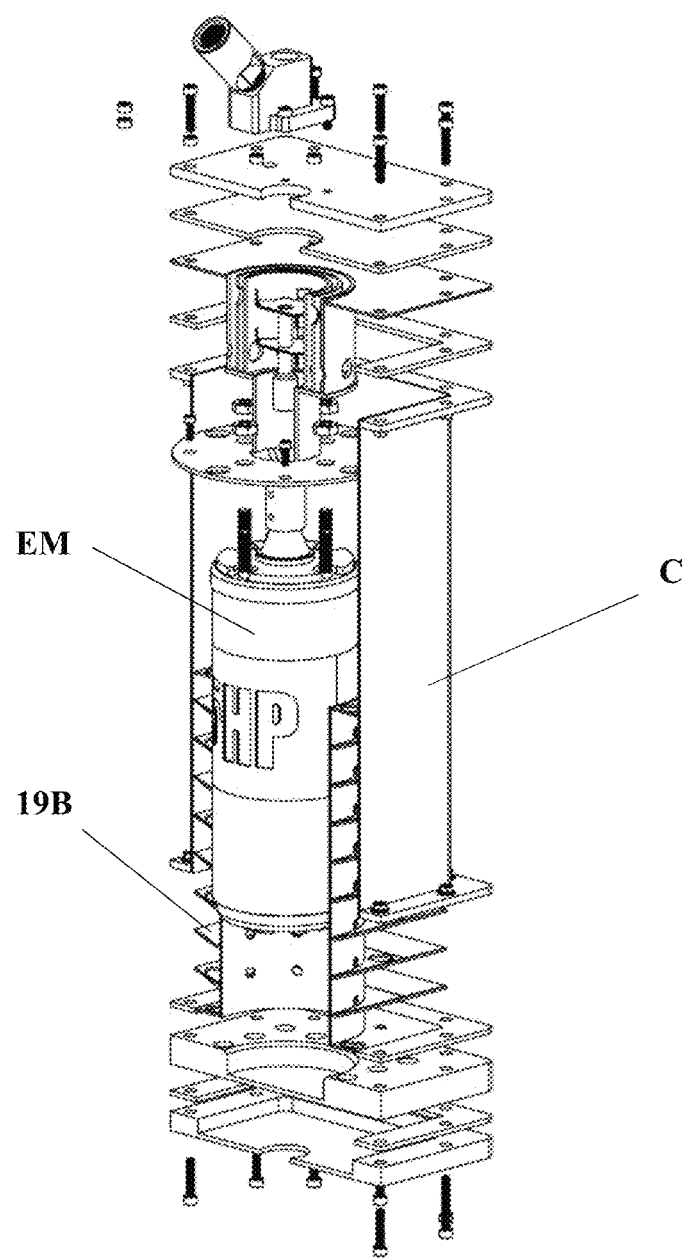
FIG. 13 shows an exploded view of the interior components of the liquid polymer or chemical activation system having a submersible electric actuator with portions of the concave aging cup removed to better show the electric actuator, in accordance with the principles of the present invention.
Figure 14:
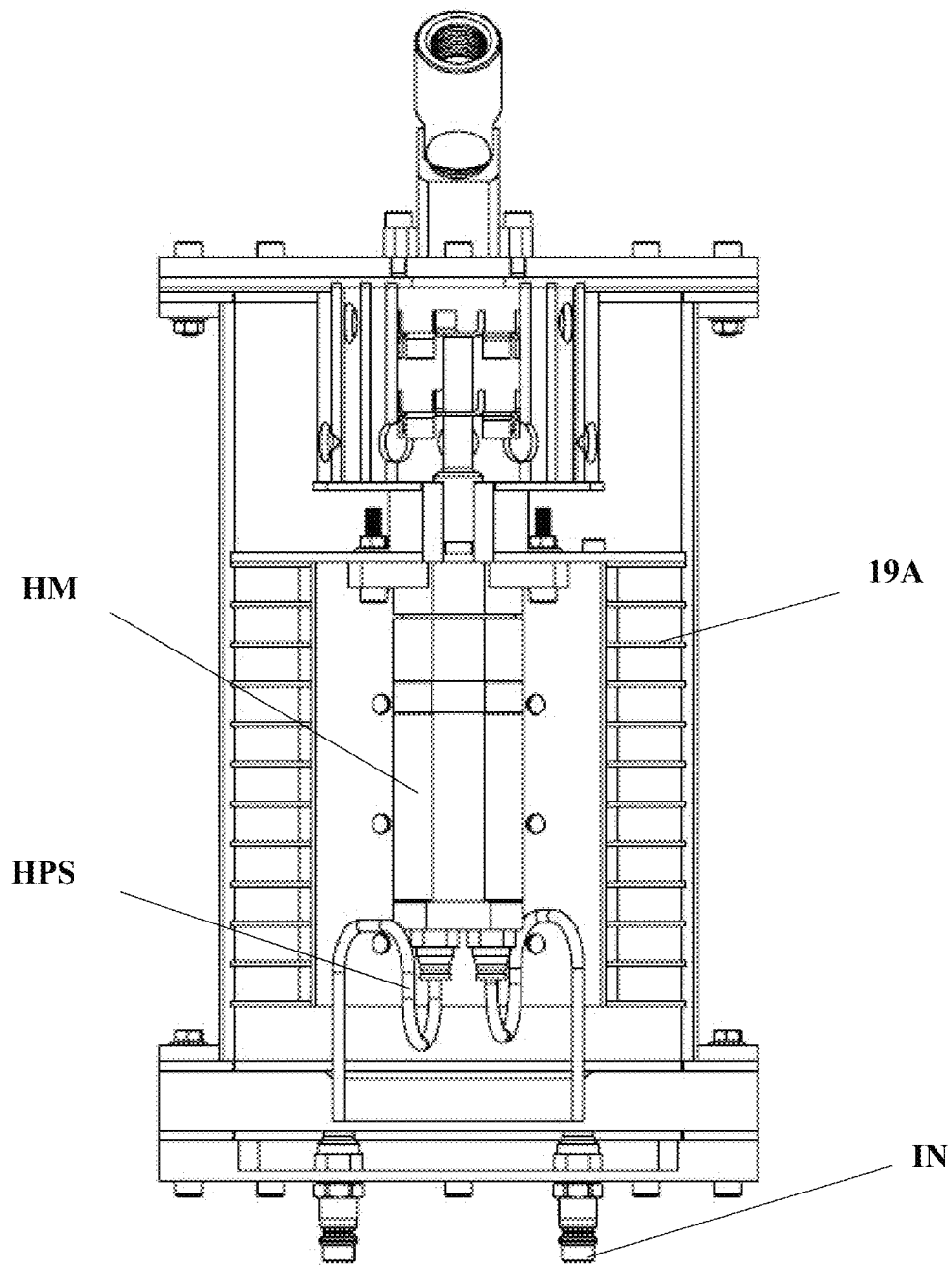
FIG. 14 shows the interior components of a liquid polymer or chemical activation system in which the linear aging cup and chamber have a squared shape, in accordance with the principles of the present invention.
Figure 15:
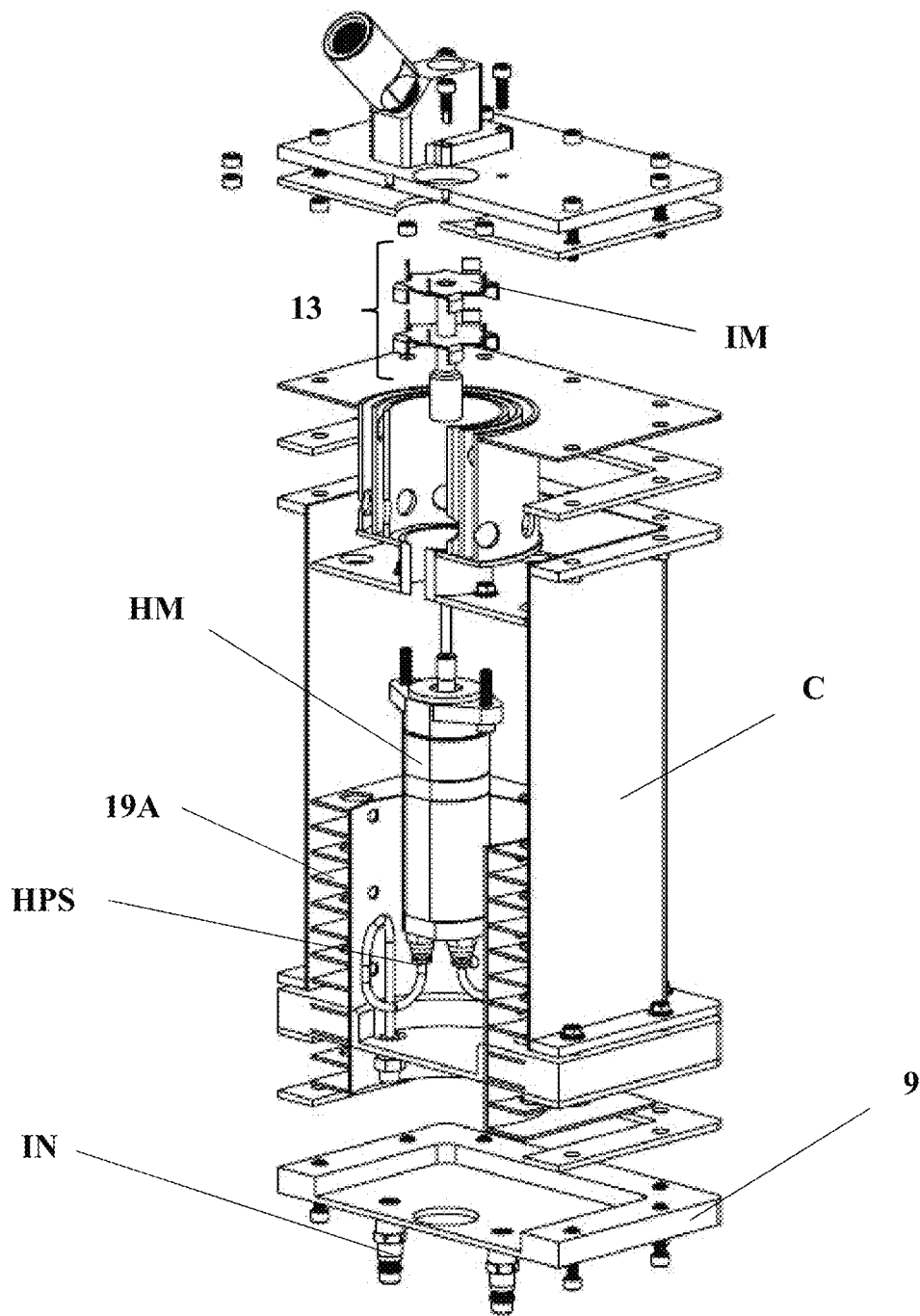
FIG. 15 shows an exploded view of the interior components of the liquid polymer or chemical activation system in which the linear aging cup and chamber have a squared shape, in accordance with the principles of the present invention.
Figure 16:
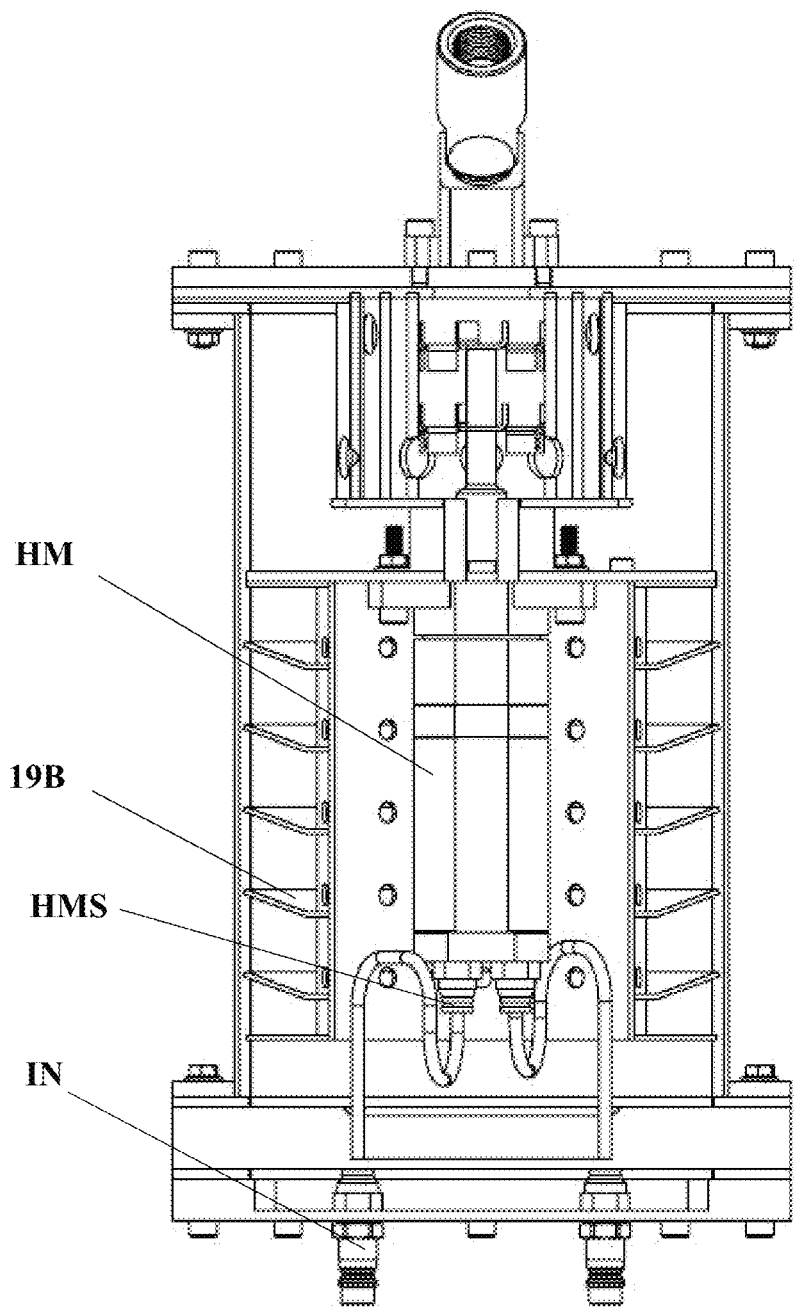
FIG. 16 shows the interior components of a liquid polymer or chemical activation system in which the concave aging cup and chamber have a squared shape, in accordance with the principles of the present invention.

The upper multistage mixing cup 14 constitutes the first blending zone of the liquid polymer or chemical activation system 1. As previously noted, the upper multistage mixing cup 14 comprises one or more retention cups RC configured to receive the one or more substances, as particularly shown in FIG. 6. The upper multistage mixing cup 14 is preferably subdivided into at least a first retention cup RC1 and a second retention cup RC2, wherein the second retention cup RC2 encircles or encloses the first retention cup RC1. For embodiments having more than two retention cups, each subsequent retention cup encircles or encloses the previous retention cup. For example, a third retention cup RC3 would encircle the second retention cup RC2, a fourth retention cup would encircle the third retention cup, and so on. It should be noted that a top portion of the upper multistage mixing cup 14 is encircled by the cup flange 6, as shown in FIG. 3. When the one or more substances enter the one or more inlet 11, the substances are led into and received by the first retention cup RC1. In embodiments having more than one inlet 11A, 11B, the one or more substances come into contact with each other for the first time in the blending reactor 10, and then flow into the first retention cup RC1. Once inside the first retention cup RC1 the one or more substances are mixed by the high shear mixer 13. As shown in FIGS. 12 and 15, the high shear mixer 13 may include at least one impeller IM to assist in mixing the one or more substances before reaching the second retention cup RC2, as further discussed below. The impeller IM and high shear mixer 13 are attached to a shaft extension SE which in turn is coupled to the submersible actuator 15 via a shaft coupling unit SCU. The submersible actuator 15 actuates the rotation of the shaft extension SE and consequently the rotation of the impeller IM and high shear mixer 13. It should be noted that the submersible actuator 15 may be a submersible electric motor or actuator EM, as shown in FIGS. 2-5 and 7-13; or a submersible pneumatic or hydraulic motor HM, as shown in FIGS. 6-9 and 14-17. For embodiments having an electric motor or actuator EM, the liquid polymer or chemical activation system 1 also comprises at least one electric power connector PC on the top cover plate 4, that comprises an insulated harness IH connected to the submersible actuator 15, as shown in FIG. 4. The horsepower of the submersible electric motor or actuator EM should preferably be between 0.3 HP and up to 300 HP. In some embodiments, however, the horsepower range may be higher or lower. For embodiments having a submersible pneumatic or hydraulic motor HM, as shown in FIGS. 6, 7, 8, 9, 14, 15, 16 and 17, the liquid polymer or chemical activation system 1 is connected to a pneumatic or hydraulic HPS power source that provides power to the pneumatic or hydraulic motor HM via inputs IN on the bottom cover plate 9, which in turn are connected to the submersible pneumatic or hydraulic motor HM.

It should be noted that, as shown in FIG. 2, a first end of the first and second retention cups RC1, RC2 are in contact with the portion of the top cover plate 4 within the chamber C, whereas a second end of the first and second retention cups RC1, RC2 are resting or supported by a support platform SP of the cup base flange 17. The first retention cup RC1 further includes one or more holes H2 for releasing the mixed one or more substances into the second retention cup RC2, which as previously noted, encircles or encloses the first retention cup RC1. Once the one or more substances are received and further mixed in the second retention cup RC2, the one or more substances are flow, via one or more holes H2 in the second retention cup RC2, into the intermediate blending stage 16. The intermediate blending section 16 constitutes the second blending zone of the liquid polymer or chemical activation system 1. It should be noted that the cup flange 6 forms the celling of the intermediate blending section 16, as shown in FIG. 2. Once in the intermediate blending section 16 the one or more substances come into contact with the cup base flange 17.

As shown in FIG. 3, the cup base flange 17 comprises one or more holes H3 configured to receive one or more bolts, screws or fasteners S that are used to connect or secure the cup base flange 17 to the submersible actuator 15 and to the plurality of rings 19 that form part of the multistage aging cup 18, as further described below. Moreover, the cup base flange 17 comprises one or more holes H4 configured to lead or provide access to the one or more substances into the lower multistage aging cup 18. As previously noted, the cup base flange 17 includes a support platform SP for supporting the retention cups RC of the upper multistage mixing cup 14. The support platform SP has at least one opening SPO that provides the shaft coupling unit SCU with access to the submersible actuator 15. It should also be noted that the submersible actuator 15 has a first end TE and a second end BE. On the first end TE the submersible actuator 15 is connected to the cup base flange 17 via one or more bolts, screws or fasteners S; whereas the second end BE of the submersible actuator 15 is fixedly resting on a groove G on the middle plate 8 that is configured to receive the second end BE of the submersible actuator 15. As such, the middle plate 8 serves as a support base for the second end BE of the submersible actuator 15. Lastly, it must be noted that the middle plate 8 is connected to the bottom cover plate 9 which, in turn, has at least one outlet 12 for releasing the one or more substances.

Figure 17:
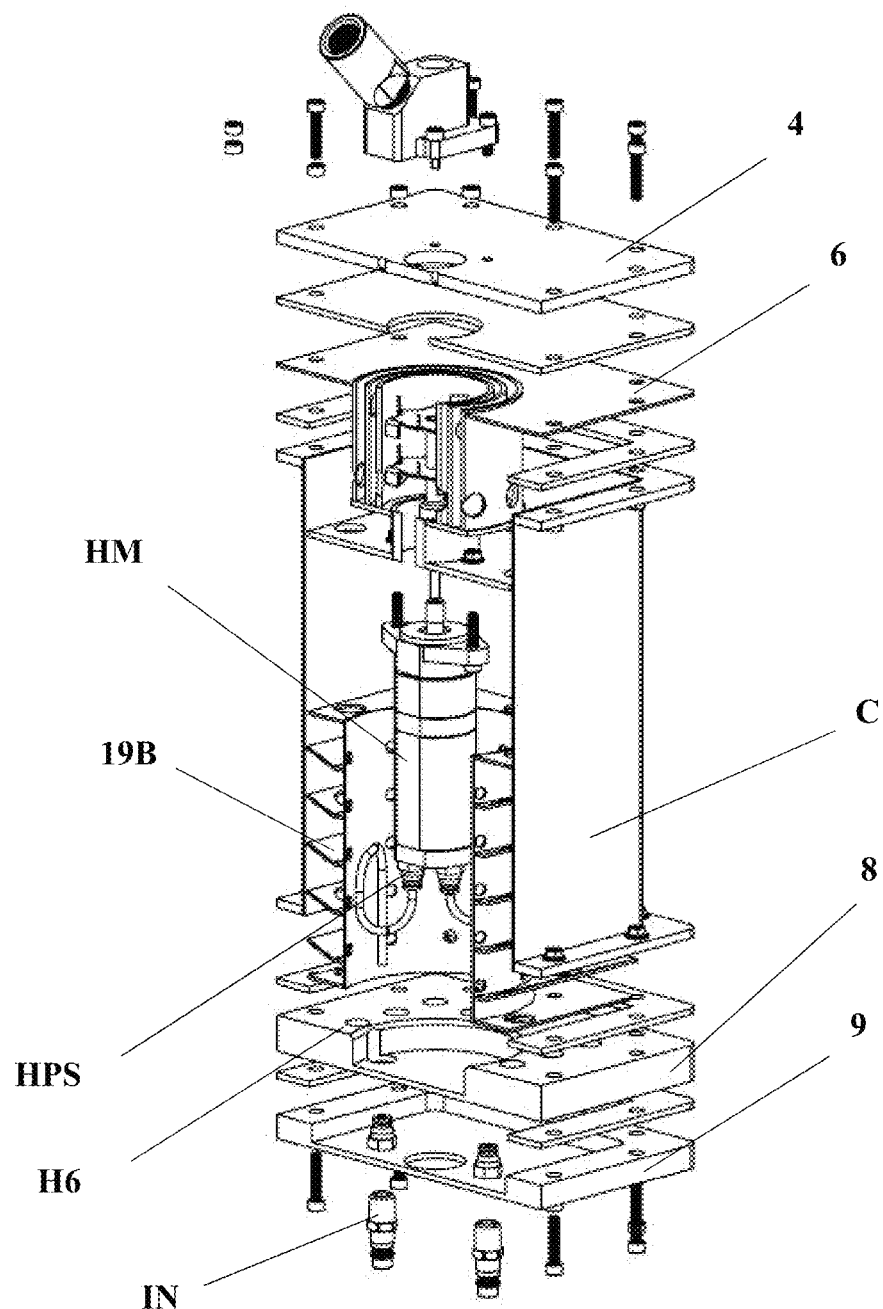
FIG. 17 shows an exploded view of the interior components of the liquid polymer or chemical activation system in which the concave aging cup and chamber have a squared shape, in accordance with the principles of the present invention.
Figure 18:
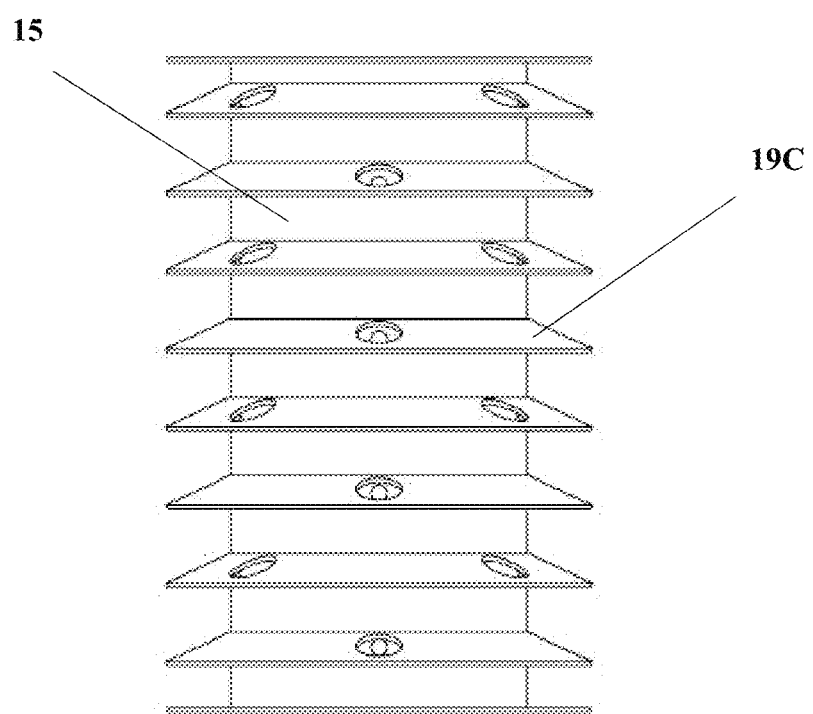
FIG. 18 shows a convex aging cup of the liquid polymer or chemical activation system, in accordance with the principles of the present invention.

As noted above, once the mixed one or more substances reach the cup base flange 17, the substances are led (by the flow of the one or more substances), via the one or more holes H4, into the lower multistage aging cup 18 (which is where the submersible actuator 15 is located). The lower multistage aging cup 18 constitutes the third blending zone of the liquid polymer or chemical activation system 1. The lower multistage aging cup 18 comprises a plurality of rings 19 surrounding the submersible actuator 15, in which the rings 19 are aligned one on top of the other. The rings 19 may be linear 19A (as shown in FIGS. 2, 3, 6, 7, 10, 11, 14, and 15), concave 19B (as shown in FIGS. 4, 5, 8, 9, 12, 13, 16, and 17), or convex 19C (as shown in FIG. 18) in relation to the submersible actuator 15; and can be manufactured from any strong durable material such as plastic, metal, etc. As previously noted, the rings 19 are secured to the cup base flange 17 via one or more bolts, screws or fasteners S. Moreover, each ring in the plurality of rings 19 includes one or more holes H5. The one or more holes H5 allow the one or more substances to further mix as the substances move down along the lower multistage aging cup 18 until it reaches the middle cover plate 8. As shown in FIG. 17, the middle cover plate 8 comprises one or more holes H6 which lead the mixed one or substances directly into the bottom cover plate 9. The bottom cover plate 9 constitute the fourth and final blending zone of the liquid polymer or chemical activation system 1 before the mixed one or more substances are released through the at least one outlet 12.

Figure 19:
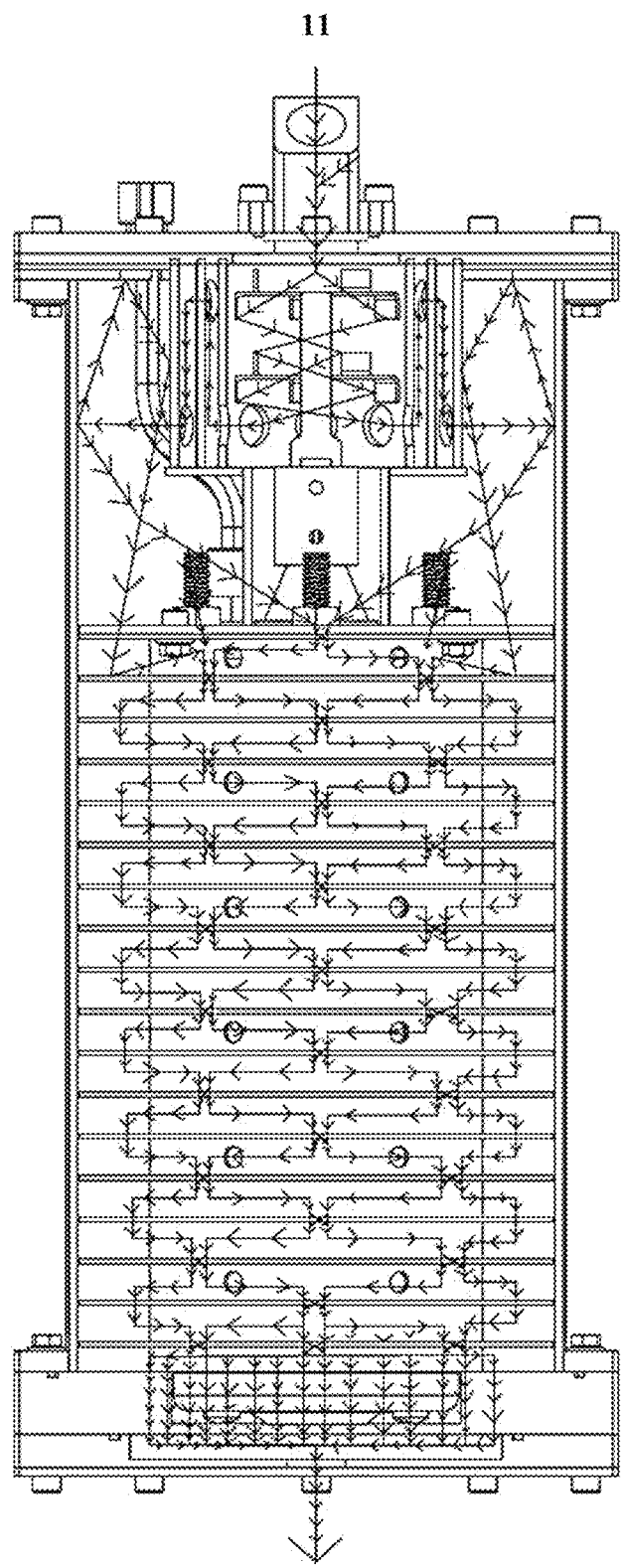
FIG. 19 shows the flow of the one or more substances as they move along the liquid polymer or chemical activation system, in accordance with the principles of the present invention.

The flow of the one or more substances along the liquid polymer or chemical activation system 1 (from the moment the substances enter through inlet 11 to the moment they are released through outlet 12) is shown in FIG. 19. Furthermore, the one or more holes H5 in the plurality of rings 19 preferably do not align with other holes in the plurality of rings 19. This configuration provides further mixing of the one or more substances. Notwithstanding, the present disclosure also contemplates a lower multistage aging cup 18 in which the one or more holes H5 in the plurality of rings 19 align with other holes in the plurality of rings 19.

As shown in FIGS. 20-25, the liquid polymer or chemical activation system 1 may also include a dry substance funnel SF attached to the blending reactor 10 via a dry substance interconnection inlet 20, which is a tube that connects the dry substance funnel SF to the blending reactor 10. A gasket SFG may be placed between the substance funnel SF and dry substance interconnection inlet 20 to provide a better connection between the dry substance funnel SF and the dry substance interconnection inlet 20. The dry substance funnel SF may be used to pour non-liquid substances, such has powdered or solid substances, into the polymer activation system 1 in order to mix it with other substances. It is important to note that the narrow portion of the dry substance funnel SF is the portion that attaches to the dry substance inlet 20. On the other hand, a hopper or container 21 may be attached, via one or more bolts, screws or fasteners S, to the wide portion of the dry substance funnel SF. The hopper or container 21 can be used to pour a larger portion of dry substances into the liquid polymer or chemical activation system 1, and may include a closeable door CD in order to provide or close user access to the dry substance funnel SF. Once a dry substance is poured through the dry substance funnel SF, the dry substance is led, via the dry substance interconnection inlet 20, to blending reactor 10 where it then reaches the first retention cup and is mixed with other substances (liquid or solid) in accordance with the principles of the present invention, as already discussed herein.

Figure 20:
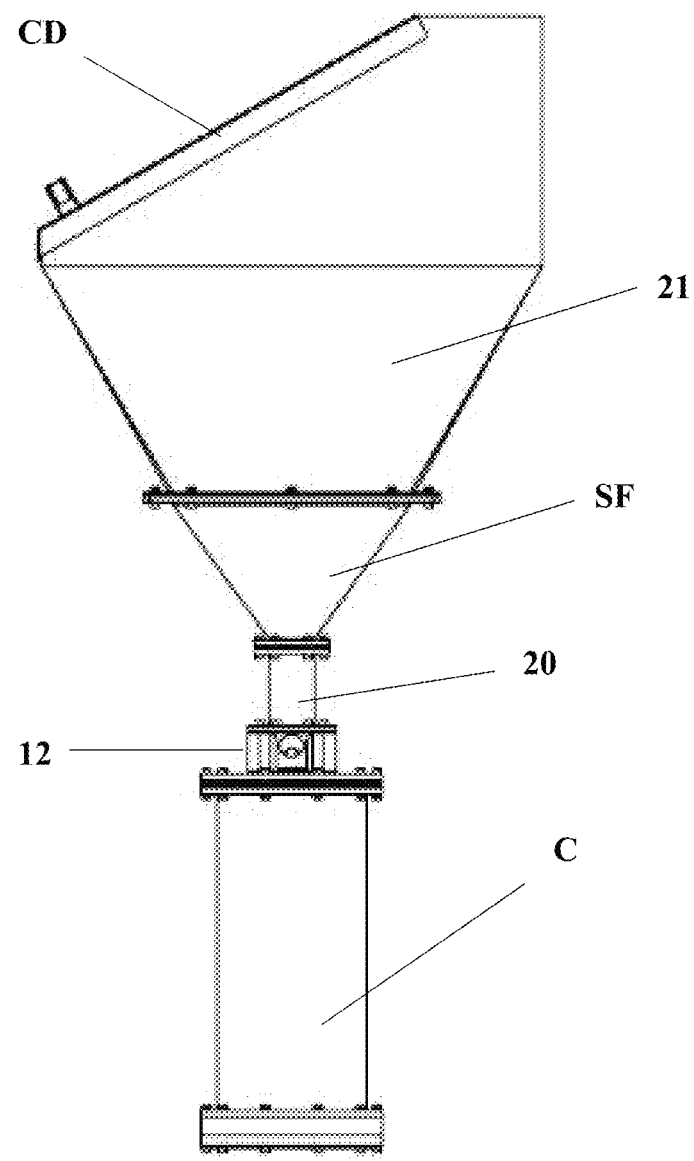
FIG. 20 shows a first embodiment of a dry substance funnel attached to the liquid polymer or chemical activation system, in accordance with the principles of the present invention.
Figure 21:
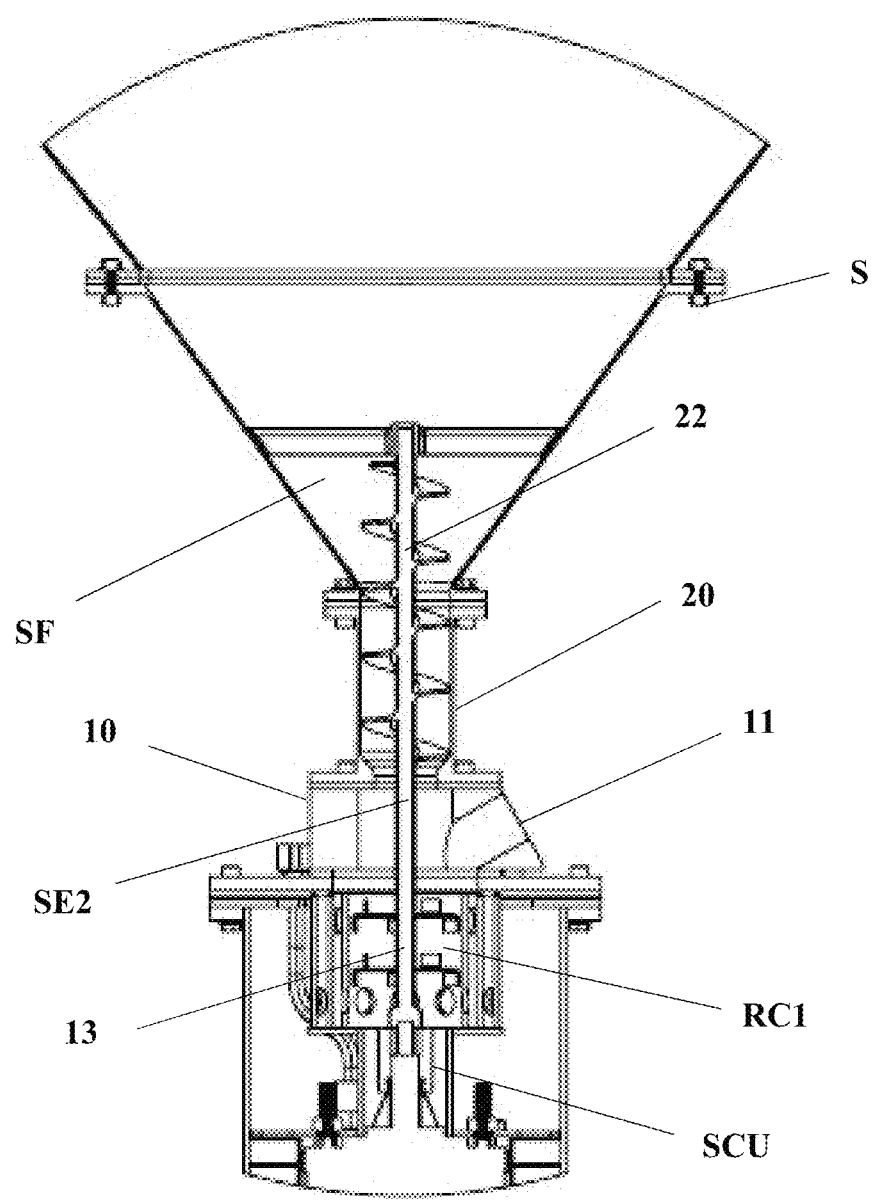
FIG. 21 shows an up-close view of the internal components of the first embodiment of a dry substance funnel.
Figure 22:
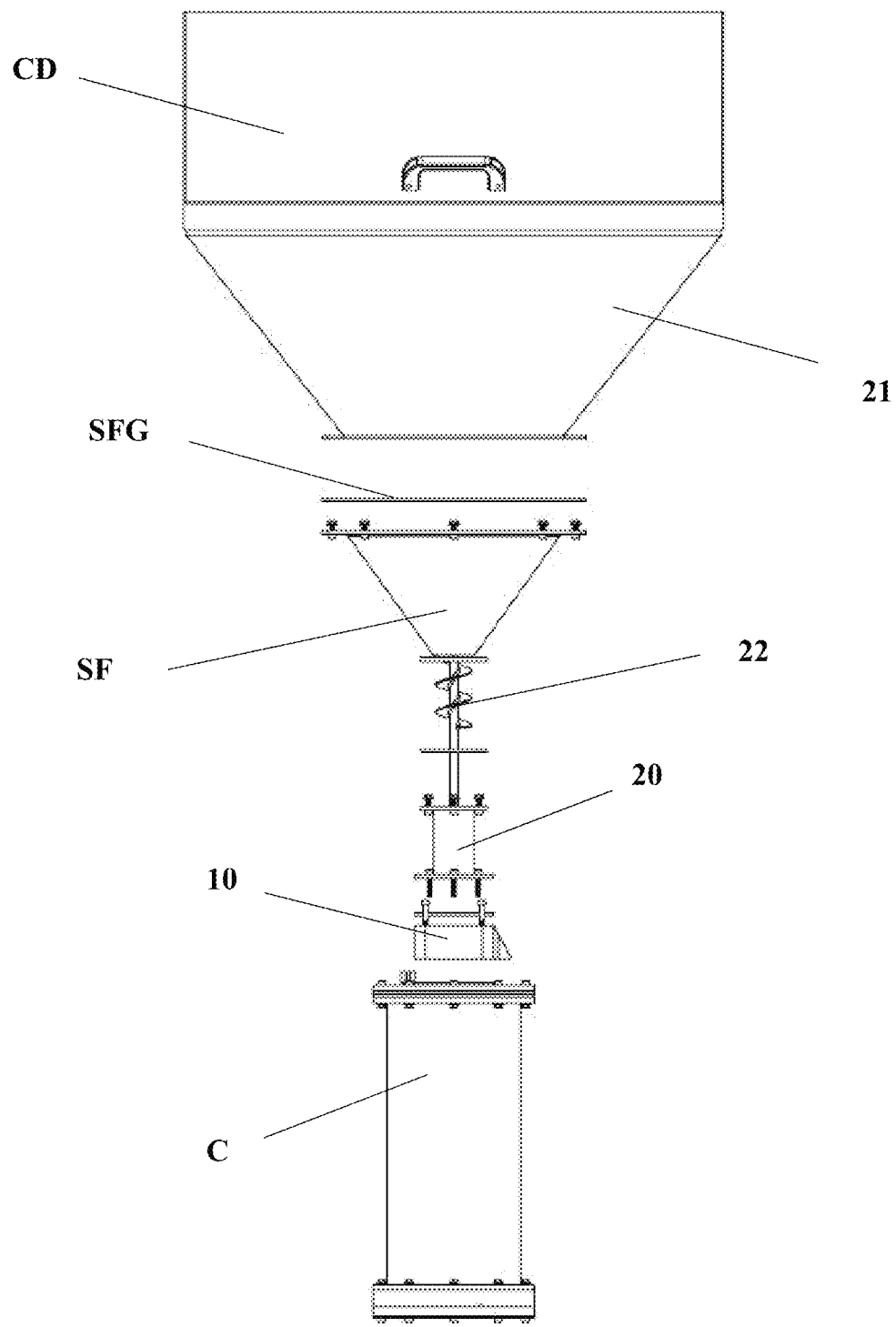
FIG. 22 shows an exploded view of the components of the first embodiment of the dry substance funnel attached to the liquid polymer or chemical activation system, in accordance with the principles of the present invention.

The present invention contemplates two embodiments in which the dry substance funnel SF may be used. In one embodiment, the dry substance funnel SF comprises a screw feeder 22 for initial mixing of the dry substance, as shown in FIGS. 20-22. In this first embodiment the liquid polymer or chemical activation system 1 comprises a longer a shaft extension SE2 that extends from the shaft coupling unit SCU all the way to the narrow portion of the dry substance funnel SF. As such, the portion of the shaft extension SE2 in the first retention cup RC1 includes the high shear mixer 13 and impeller IM; while the portion of the shaft extension SE2 in the narrow portion of the dry substance funnel SF includes the screw feeder 22. As the shaft extension SE2 rotates, the screw feeder 22 also rotates in order to begin initial mixing of the dry substance. The rotation of the screw feeder 22 is slow on order to control the dosage of the dry substances. Once the dry substance reaches the first retaining cup RC1, the substance mixes with the other substance poured through inlet 11.

Figure 23:
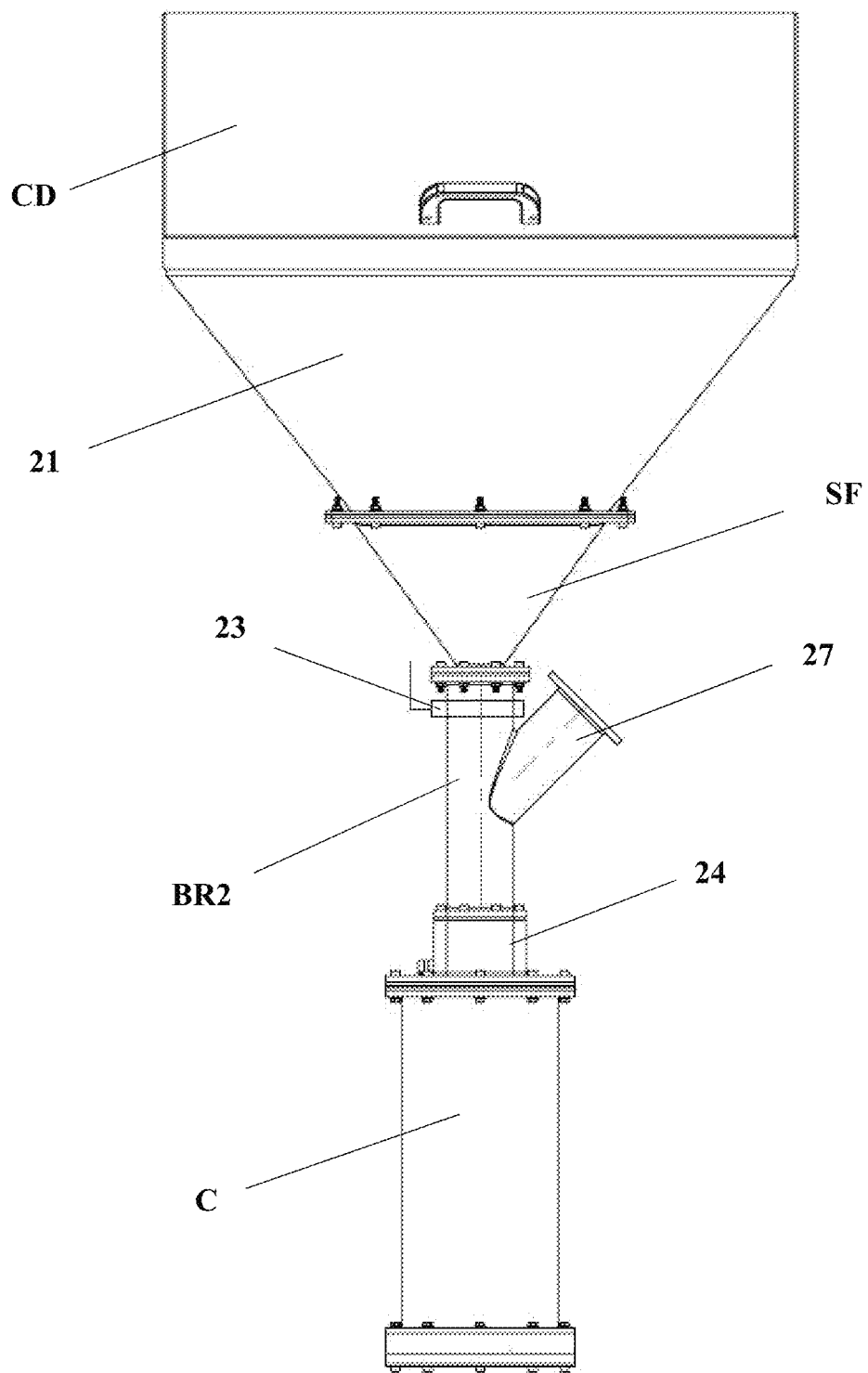
FIG. 23 shows a second embodiment of a dry substance funnel attached to the liquid polymer or chemical activation system, in accordance with the principles of the present invention.
Figure 24:
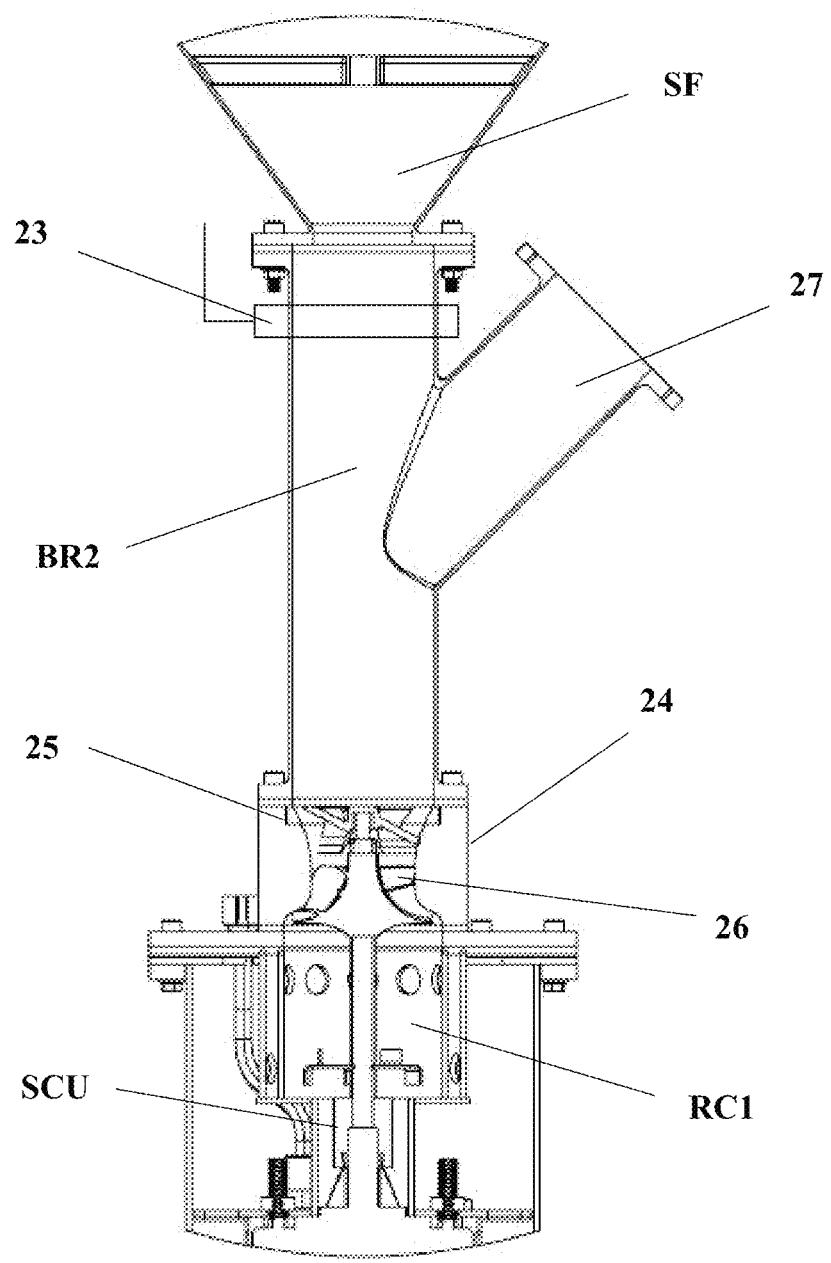
FIG. 24 shows an up-close view of the internal of the second embodiment of a dry substance funnel.
Figure 25:
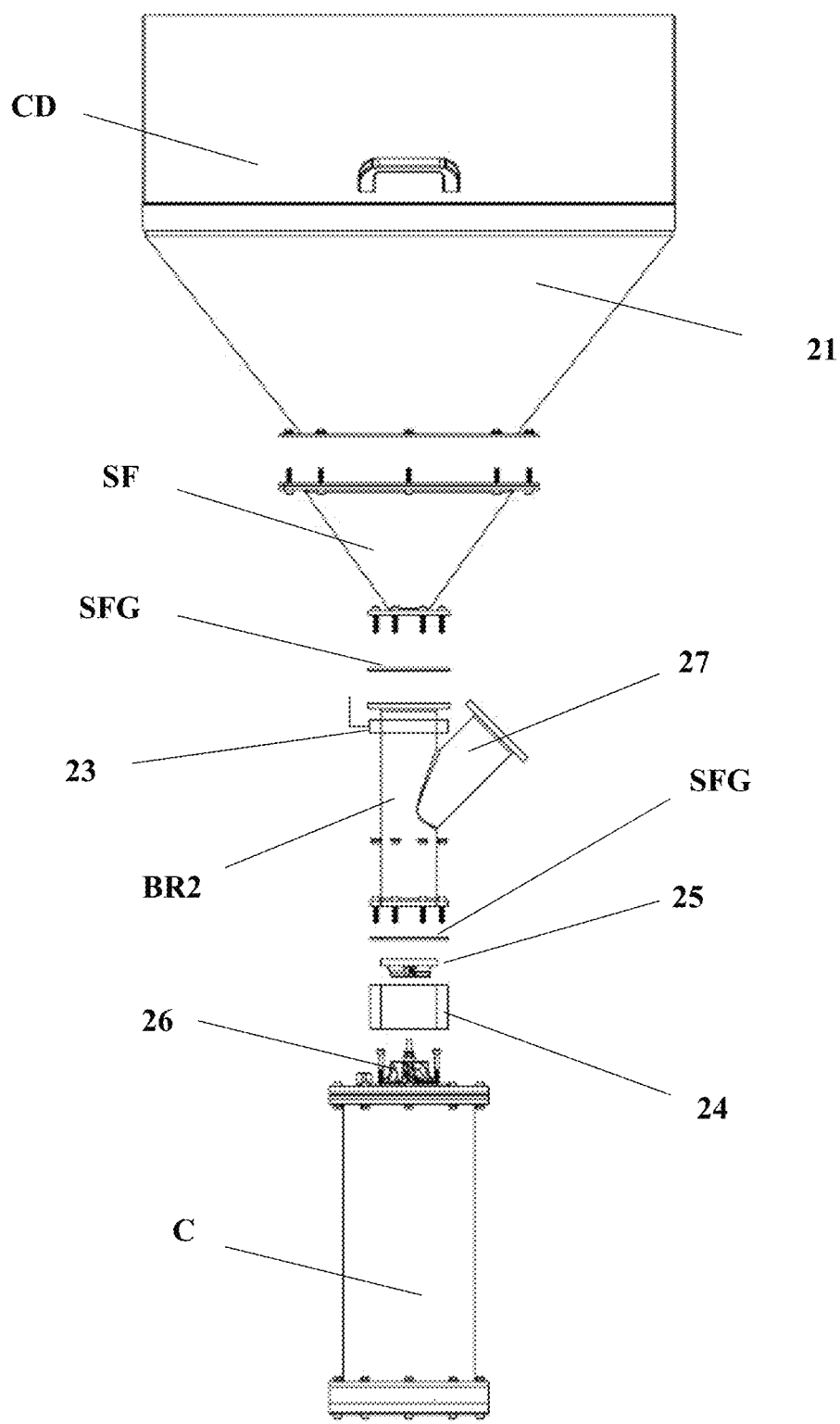
FIG. 25 shows an exploded view of the components of the second embodiment of the dry substance funnel attached to the liquid polymer or chemical activation system, in accordance with the principles of the present invention.

In the second embodiment, the narrow portion of the dry substance funnel SF is connected to the top end of a larger blending reactor BR2 via one or more bolts, screws or fasteners S, as shown in FIGS. 23-25. A gasket SFG may be incorporated between the dry substance funnel SF and top portion of the blending reactor BR2 for better connection between these two elements. In this embodiment, the blending reactor BR2 comprises a control valve 23 for controlling the amount of dry substances that enters the blending reactor BR2; and also comprises an inlet 27 for receiving liquid substances. The bottom end of the blending reactor BR2 is connected, via one or more bolts, screws or fasteners S, to a compartment 24 that includes a stator 25. The compartment 24, in turn, is connected to the top cover plate 4. The stator 25 comprises one or more jet impellers 26, which serve the purpose of pushing the substances from the blending reactor BR2 into the first retention cup RC1. A gasket SFG may be incorporated between the bottom portion of the blending reactor BR2 and the compartment 24 for better connection between these two elements. Once a dry substance is poured through the dry substance funnel SF, the substance is led to the blending reactor BR2 where it comes into contact with the liquid substance poured via the inlet 27. The substances are then vigorously mixed by the jet impellers 26 and are then pushed into the first retention cup RC1 to be mixed in accordance with the principles of the present invention, as already discussed herein.

It is important to note that in this second embodiment, the liquid polymer activation or chemical system 1 also comprises a longer a shaft extension SE2 that extends from the shaft coupling unit SCU all the way to the compartment 24 and is connected to the jet impellers 26. As such, the rotation of the shaft extension SE2 enables the rotation of the jet impellers 26.

Figure 26:
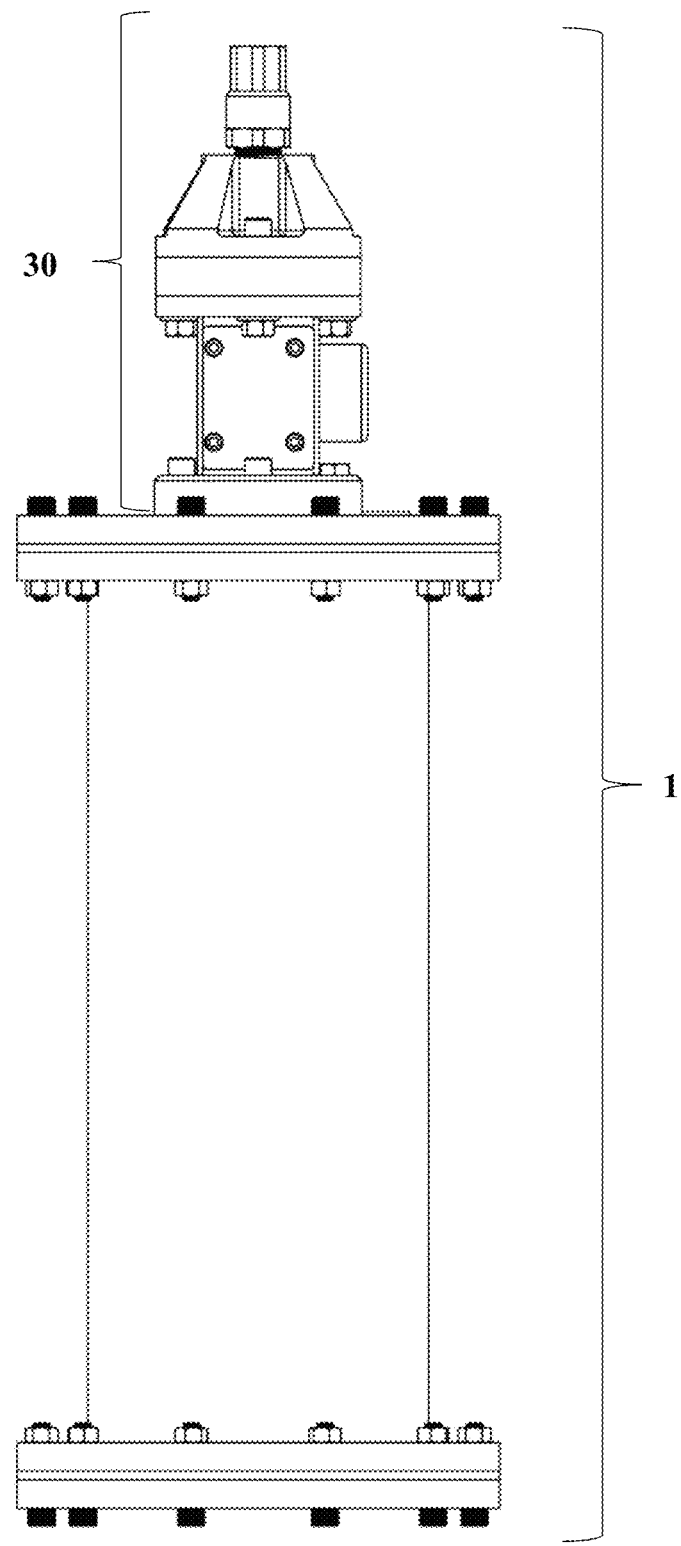
FIG. 26 shows a hybrid pump and blending reactor connected to a liquid polymer or chemical activation system, in accordance with the principles of the present invention.
Figure 27:
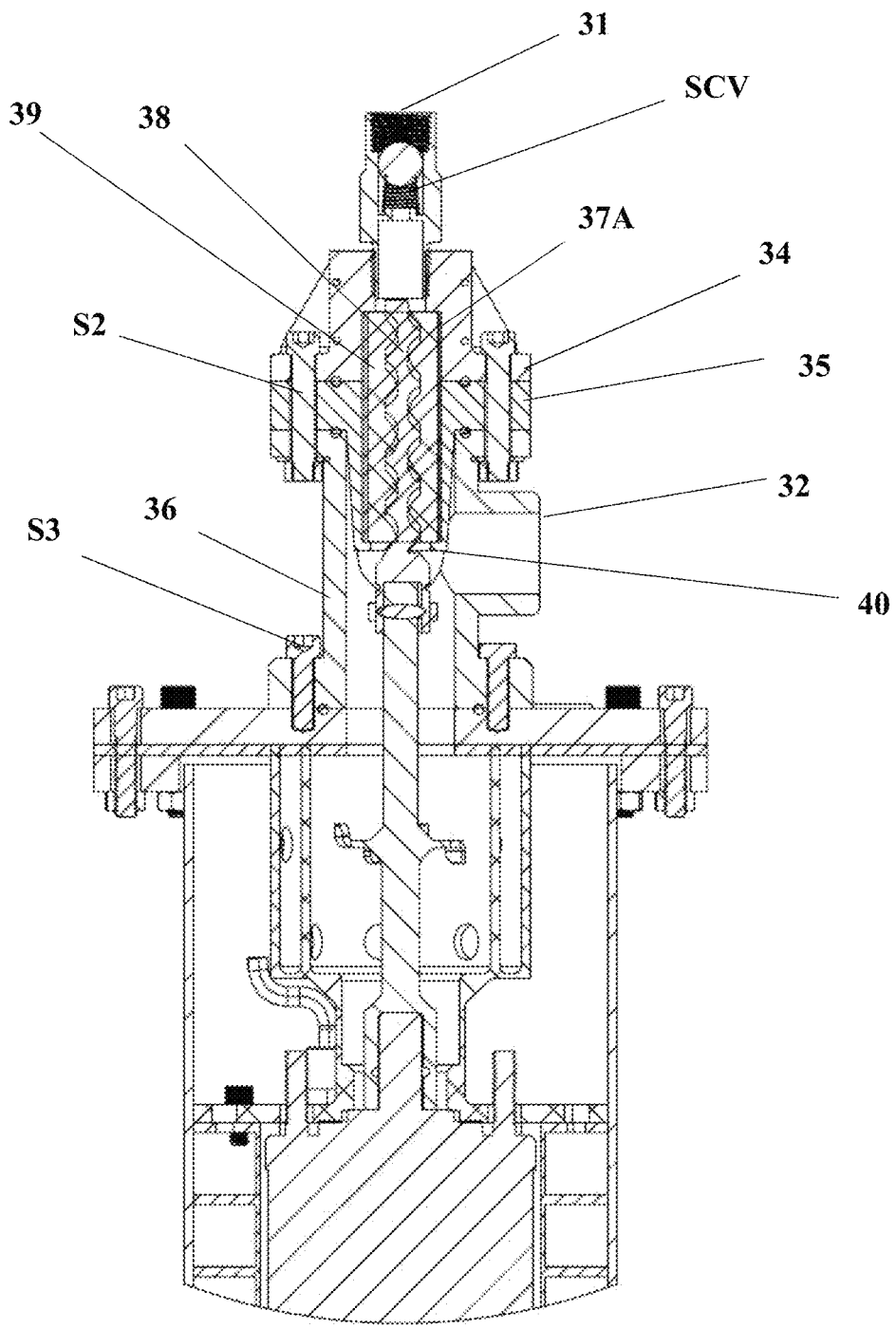
FIG. 27 shows a cutaway view of the hybrid pump and blending reactor, in accordance with the principles of the present invention.
Figure 28:
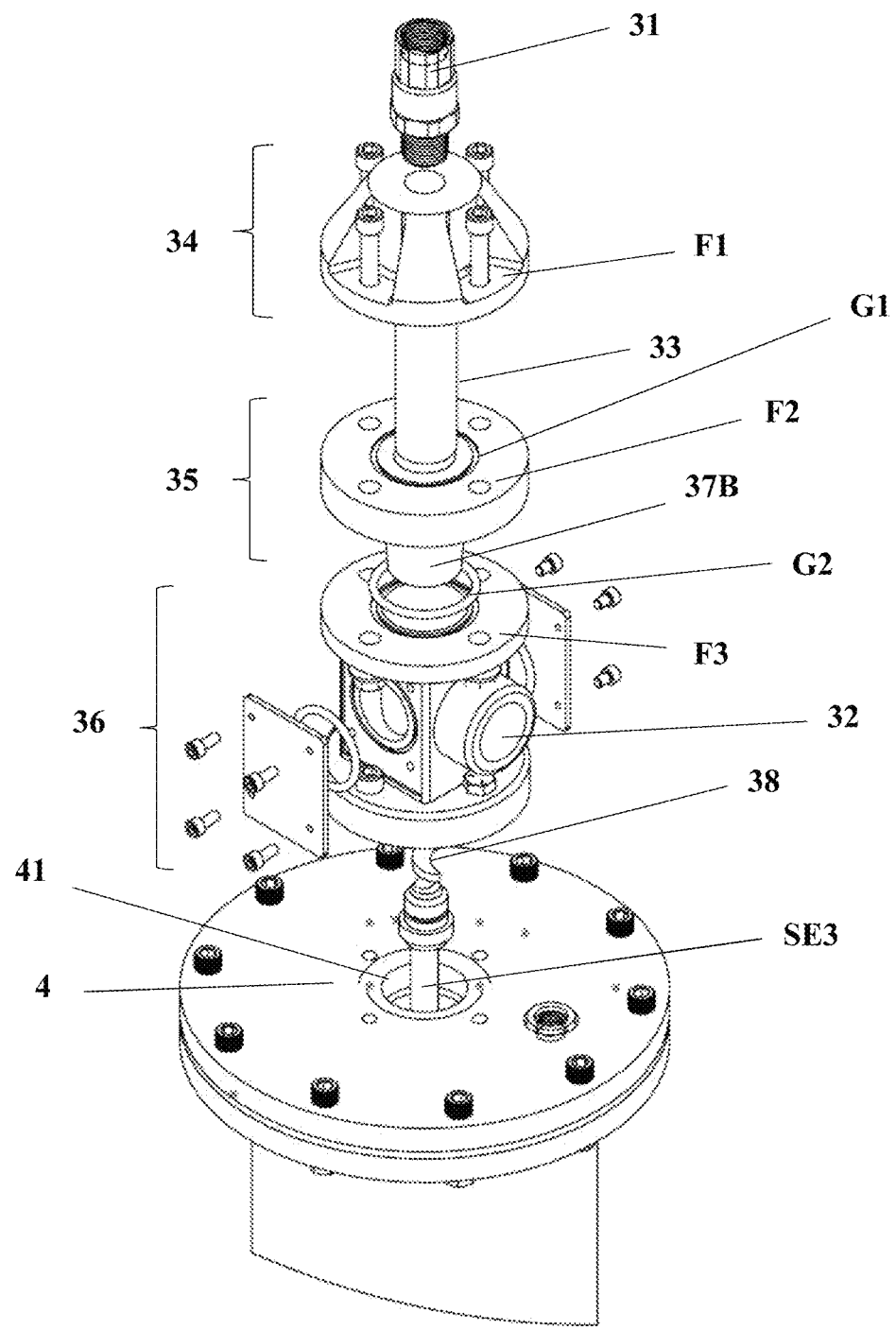
FIG. 28 shows an exploded view of the components of the hybrid pump and blending reactor, in accordance with the principles of the present invention.

FIGS. 26-30 show an alternate embodiment of the liquid polymer or chemical activation system 1 previously described in FIGS. 1-17. In this embodiment, in place of the blending reactor 10, the liquid polymer or chemical activation system 1 includes a hybrid pump and blending reactor 30 (the "HP blending reactor"), as shown on FIG. 27. The HP blending reactor 30 comprises at least two inlets 31, 32, a submersible progressive cavity pump 33, a progressive cavity pump supporting top 34 (the "PCP supporting top"), a progressive cavity pump supporting base 35 (the "PCP supporting base") and a connecting port 36, wherein the progressive cavity pump 33 comprises a rotor 38 and stator 39; and wherein the progressive cavity pump 33 is enclosed within the PCP supporting top 34 and PCP supporting base 35. Such enclosure is possible because both the PCP supporting top 34 and PCP supporting base 35 include an internal opening or chamber 37A, 37B, in which the openings 37A, 37B align with one another and are configured to support and/or hold the stator 39 component of the submersible progressive cavity pump 33 tightly in place, as shown in FIGS. 27-28. As such, the PCP supporting top 34 and PCP supporting base 35 work as a housing for the PCP cavity pump 33.

The PCP supporting top 34, the PCP support base 35 and the connecting port 36, all comprise flanges or lips F1, F2, F3, that align with one another and include one or more holes configured to receive one or more bolts S2. In this manner, the PCP supporting top 34, the PCP supporting base 35 and the connecting port 36, are tightly pressed against each other when secured via the one or more bolts, screws or fasteners S2. It should be noted that while one end (i.e., the top end) of the connecting port 36 is secured to the PCP supporting top 34 and PCP supporting base 35, the opposite end (i.e., the bottom end) of the connecting port 36 is secured, via one or more bolts S3, to the top cover plate 4. Furthermore, while one end (i.e., the bottom end) of the PCP supporting top 34 is secured to the PCP supporting base 35 and connecting port 36, the opposite end (i.e., the top end) is connected to the first inlet 31, as further discussed below. An O-ring seal G1, G2 may be included between the PCP supporting top 34 and PCP supporting base 35 and/or between the PCP supporting base 35 and connecting port 36, to prevent substance leakage in these areas.

As previously noted, the HP blending reactor 30 comprises a first inlet 31 and a second inlet 32. As shown in FIGS. 26-28, the first inlet 31 is connected or secured to a top end of the PCP supporting top 34, and its purpose is to facilitate the introduction of a first substance, preferably a polymer, into the HP blending reactor 30. The second inlet 32, on the other hand, is located on the connecting port 36 and its purpose is to facilitate the introduction of a second substance, preferably water, into the HP blending reactor 30. The first inlet 31, which may include a suction check valve SCV, leads the first substance into the progressive cavity pump 33, which, as previously noted, comprises a rotor 38 and a stator 39. The basic working principle of operation is a rotor (usually made of solid metal) shaped as a single helix rotating inside a stator (usually made of an elastomer) that has a double helix cavity. The rotation of the rotor 38 in the progressive cavity pump 33 creates a vacuum that pulls the first substance from the first inlet 31 towards the connecting port 36. As the first substance passes along the progressive cavity pump 33, the rotor 38 creates doses of the first substance before it (i.e., the first substance) reaches the connecting port 36. The connecting port 36 provides a second point of access to the HP blending reactor 30, via the second inlet 32, that is independent from the first inlet 31. In this manner, the second substance only comes into contact with the first substance once the desired doses of the first substance have been generated by the progressive cavity pump 33. Accordingly, it is only after the first substance (e.g., the polymer) reaches the connecting port 36, that the first substance comes into contact and mixes with the second substance (e.g., water). The first and second substances are then led into the first retaining cup RC1 for further mixing, in accordance with the principles of the present invention, as already discussed herein.

Figure 29:
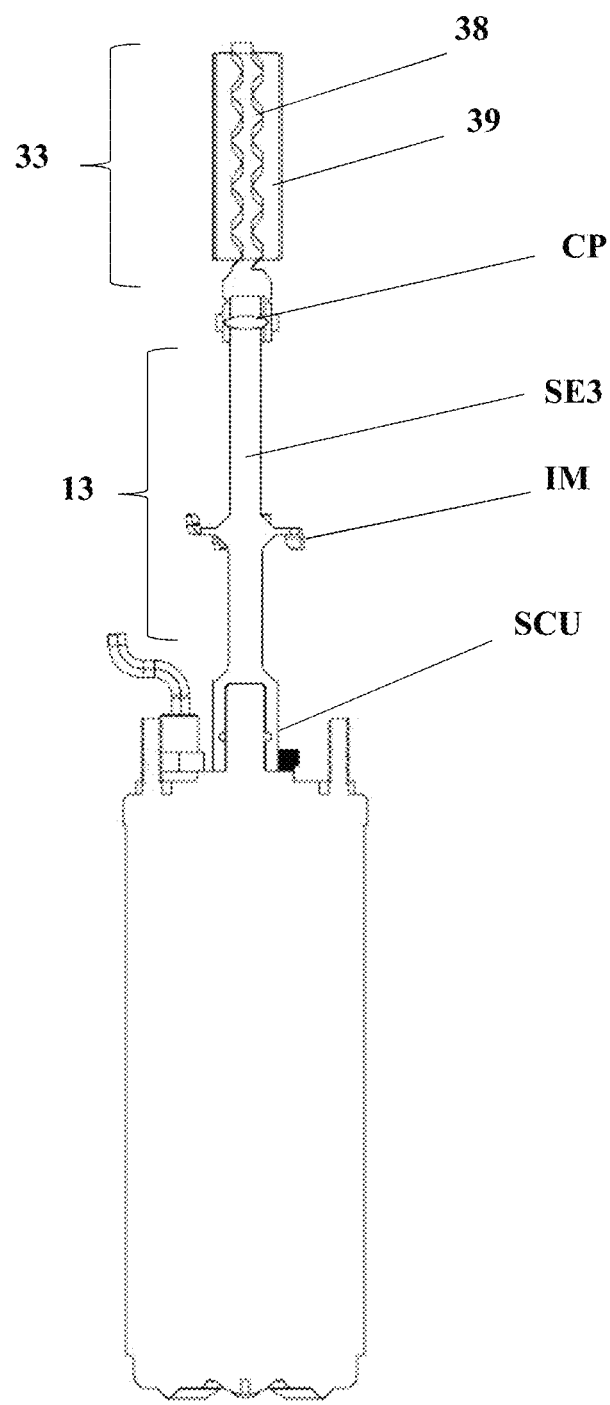
FIG. 29 shows a shaft extension and progressive cavity pump of the hybrid pump and blending reactor, in accordance with the principles of the present invention.
Figure 30:
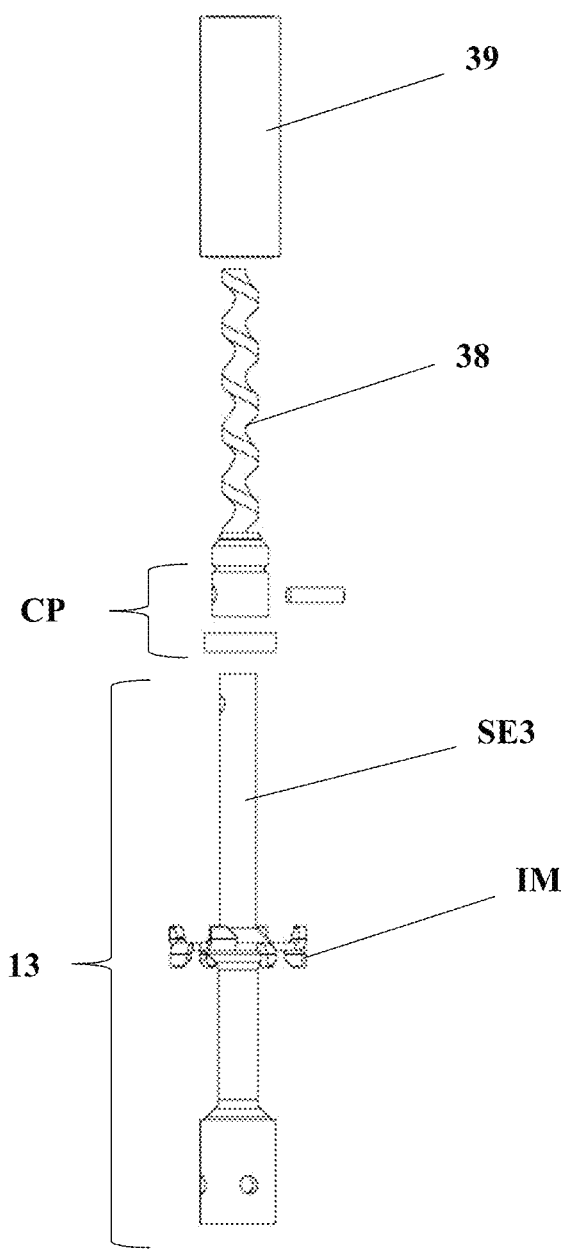
FIG. 30 shows an exploded view of the shaft extension and components of the progressive cavity pump of the hybrid pump and blending reactor, in accordance with the principles of the present invention.

Furthermore, this alternate embodiment of the liquid polymer or chemical activation system 1 also includes a shaft extension SE3 that extends from the shaft coupling unit SCU all the way to the progressive cavity pump 33 in the HP blending reactor 30. Particularly, one end of the shaft extension SE3 is connected to the shaft coupling unit SCU and the other end is connected to the rotor 38 in the progressive cavity pump 33, via a coupling pin CP mechanism, as shown in FIGS. 29-30. The portion of the shaft extension SE3 in the first retaining cup RC1 includes a high sheer mixer 13, which in turn comprises an impeller IM. The submersible actuator 15 actuates the rotation of the shaft extension SE3 and consequently the rotation of the high shear mixer 13, the impeller IM and the rotor 38. Lastly, it is important to note that the cover plate 4 and PCP supporting base 35 each have an opening 40, 41, in order to provide the shaft extension SE3 with access to the progressive cavity pump 33 from the shaft coupling unit SCU. These openings allow the shaft extension SE3 to engage with both the shaft coupling unit SCU on one end and the rotor 38 on the other end.

FIGS. 31-37 show a submersible substance separator system 50 that is driven by an actuator that is configured to separate two or more substances (e.g., oil and water) mixed together using centrifugal forces. The substance separator system 50 comprises an outer hollow chamber OC having a first distal end DE1' and a second distal end DE2', wherein each distal end is opposite to each other. The first distal end DE1' of the outer chamber OC includes a top chamber flange 2' having one or more holes configured to receive one or more bolts, screws or fasteners S'. The second distal end DE2' of the outer chamber OC, on the other hand, includes a bottom chamber flange 3' having one or more chamber outlets 20a, 20b, 20c for releasing the separated substances. The outer chamber OC may be circular in shape, as shown in FIGS. 31-35; but may have any other shape.

Figure 31:
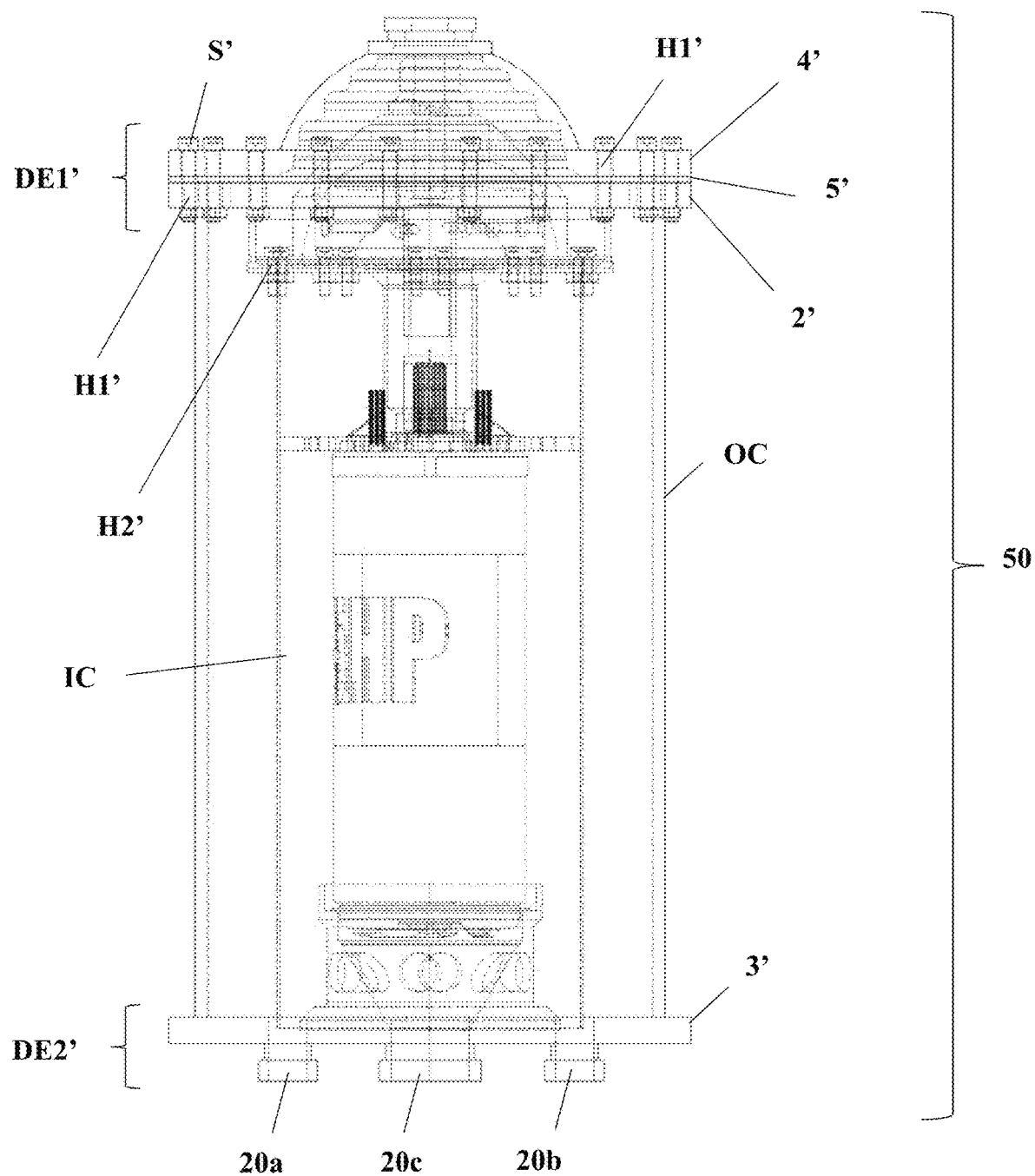
FIG. 31 shows a substance separator system that is driven by a submersible actuator.
Figure 32:
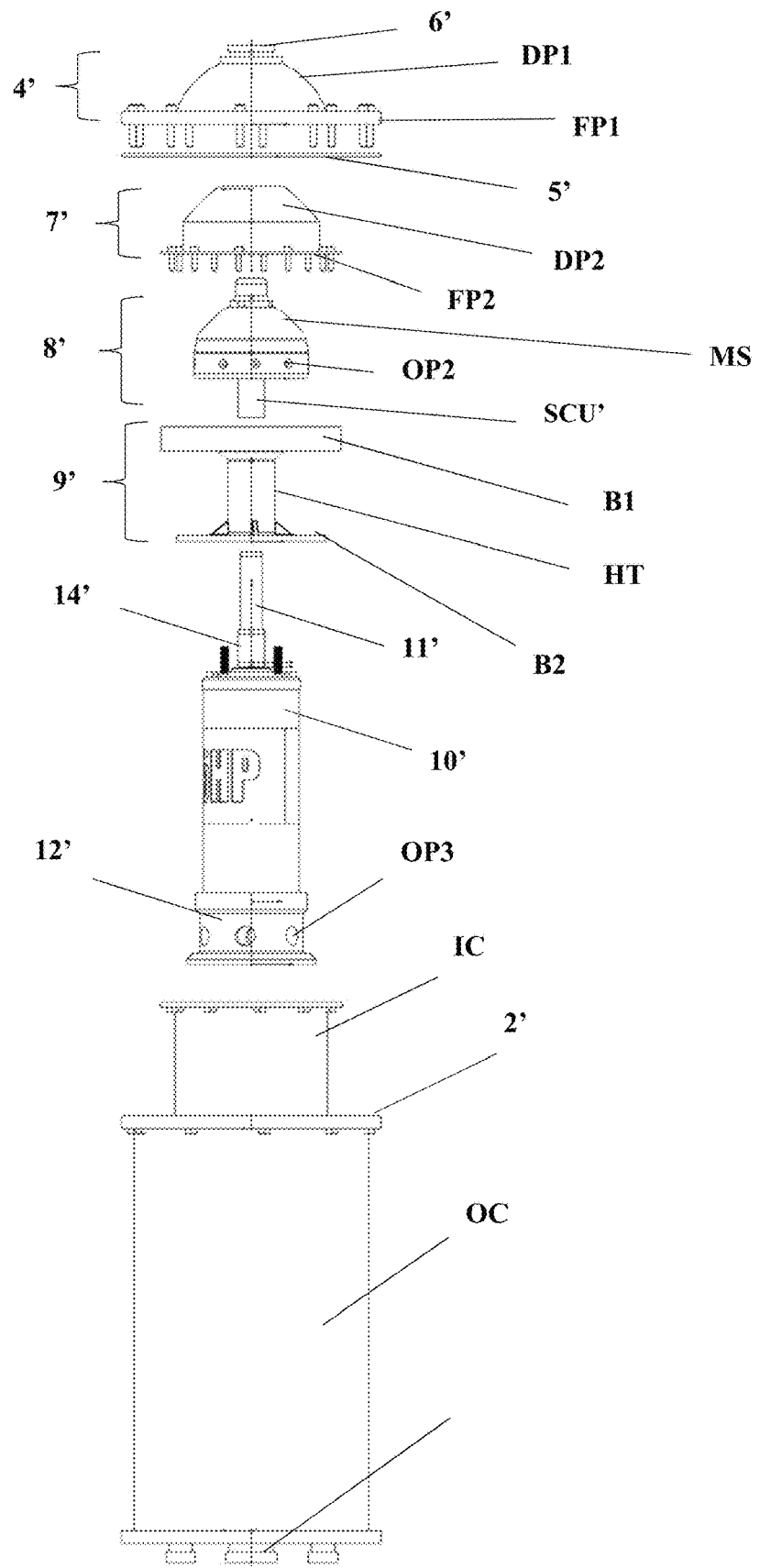
FIG. 32 shows an exploded view of the components of the substance separator system that is driven by a submersible actuator.

Additionally, as shown in FIGS. 31-32, the substance separator system 50 comprises a top cover plate 4' connected to or secured to the top chamber flange 2' on the first distal end DE1 of the outer chamber OC via one or more bolts, screws or fasteners S'. The substance separator system 50 may also include a gasket 5' (which may be a rubber gasket) located between the top cover plate 4' and the top chamber flange 2', in order to seal any space between those two elements (i.e., the top cover plate 4' and top chamber flange 2'). Each of the top cover plate 4', gasket 5' and top chamber flange 2' includes one or more holes H1' that align with each other and are configured to receive the one or more screws S'. In this manner, the top cover plate 4', the gasket 5', and the top chamber flange 2' are tightly pressed against each other when secured via the one or more bolts, screws or fasteners S'. Furthermore, the bottom chamber flange 3', which serves as the bottom of the substance separator system 50, is secured to the second distal end DE2' of the hollow chamber C' via one or more bolts, screws or fasteners S' or secured thereto by welding the bottom chamber flange 3' to the second distal end DE2' of the outer chamber OC. Accordingly, the configuration of the substance separator system 50 creates a hollow space inside the outer chamber OC that is flanked by the top cover plate 4' and the bottom chamber flange 3'.

As shown in FIG. 32, the substance separator system 50 further comprises an upper cup 7', a disc stack separator 8', a middle cup 9', a submersible actuator 10', a lower cup 12', and an interior chamber IC within the outer chamber OC. It should be noted that one or more of the chamber outlets 20a, 20b are configured to release a separated substance located inside the outer chamber OC; whereas at least one of the chamber outlets 20c is configured to release a separated substance located inside the interior chamber IC. As such, chamber outlets 20a, 20b correspond to the outer chamber OC, while chamber outlet 20c corresponds to the inner chamber IC. The separated substance released via chamber outlet 20c does not come into contact with the separated substances released via chamber outlets 20a or 20b.

As also shown in FIG. 32, the top cover plate 4' includes a solution inlet 6' that is configured to receive two or more substances that have been mixed together and lead them into the disc stack separator 8'. Moreover, the top cover plate 4' is configured to fit over and enclose the upper cup 7'; and preferably includes a dome shaped portion DP1 and a flat portion FP1. The top cover plate 4' further includes one or more holes H' on the flat portion FP1 that are configured to receive one or more bolts S' that will be used to secure the top cover plate 4' to the top chamber flange 2'. The upper cup 7', in turn, is configured to fit over and enclose at least a portion of the disc stack separator 8' (e.g., the mid-section MS of the separator 8', as further discussed below); and preferably includes a domed shaped portion DP2 and a flat portion FP2. The upper cup 7' includes an opening in the domed shaped portion DP2 that is configured to receive and accommodate an extended portion EP of the disc stack separator 8'. The upper cup 7' further includes one or more holes H' on the flat portion FP2 (and a series of holes that are configured to receive one or more bolts S' that will be used to secure the upper cup 7' to the top base B1 of the middle cup 9' and to the inner cup IC.

The disc stack separator 8' is used for centrifugation and is configured to receive the one or more substances from the solution inlet 6'. During centrifugation various phases of solids and liquids are isolated from one another based on the difference in densities. Disc stack separators use the force of gravity to separate liquid with a specific density from other liquids and solids. A disc stack within the separator contributes to higher separation efficiency by substantially increasing the separation area in the separator. This means that the separation task using a centrifugal separator not only takes place significantly faster but results in higher quality and higher yield.

Figure 33:
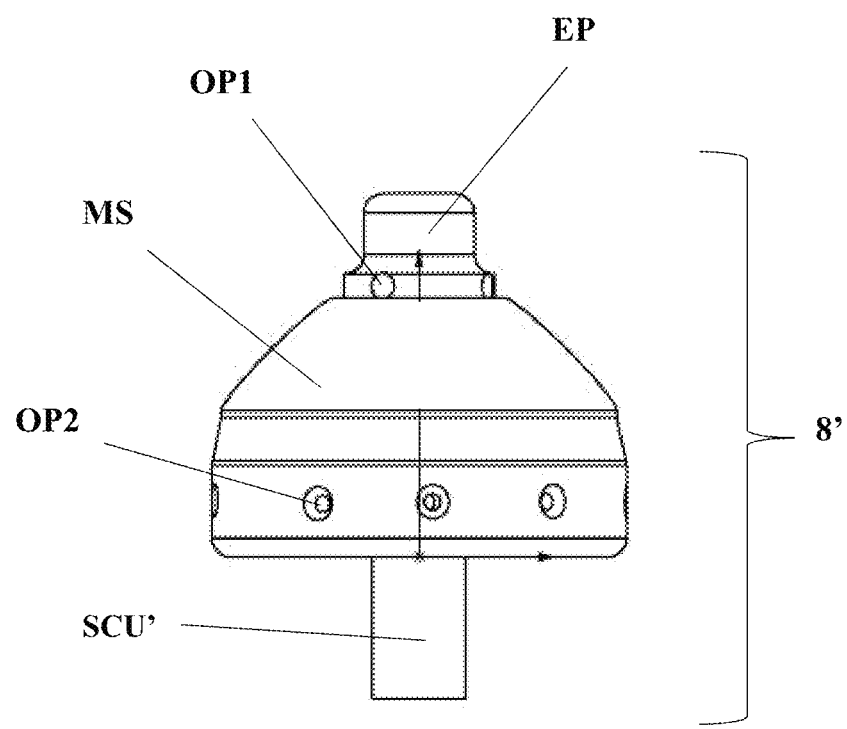
FIG. 33 shows an expanded view of one of the components of the substance separator system that is driven by a submersible actuator.
Figure 34:
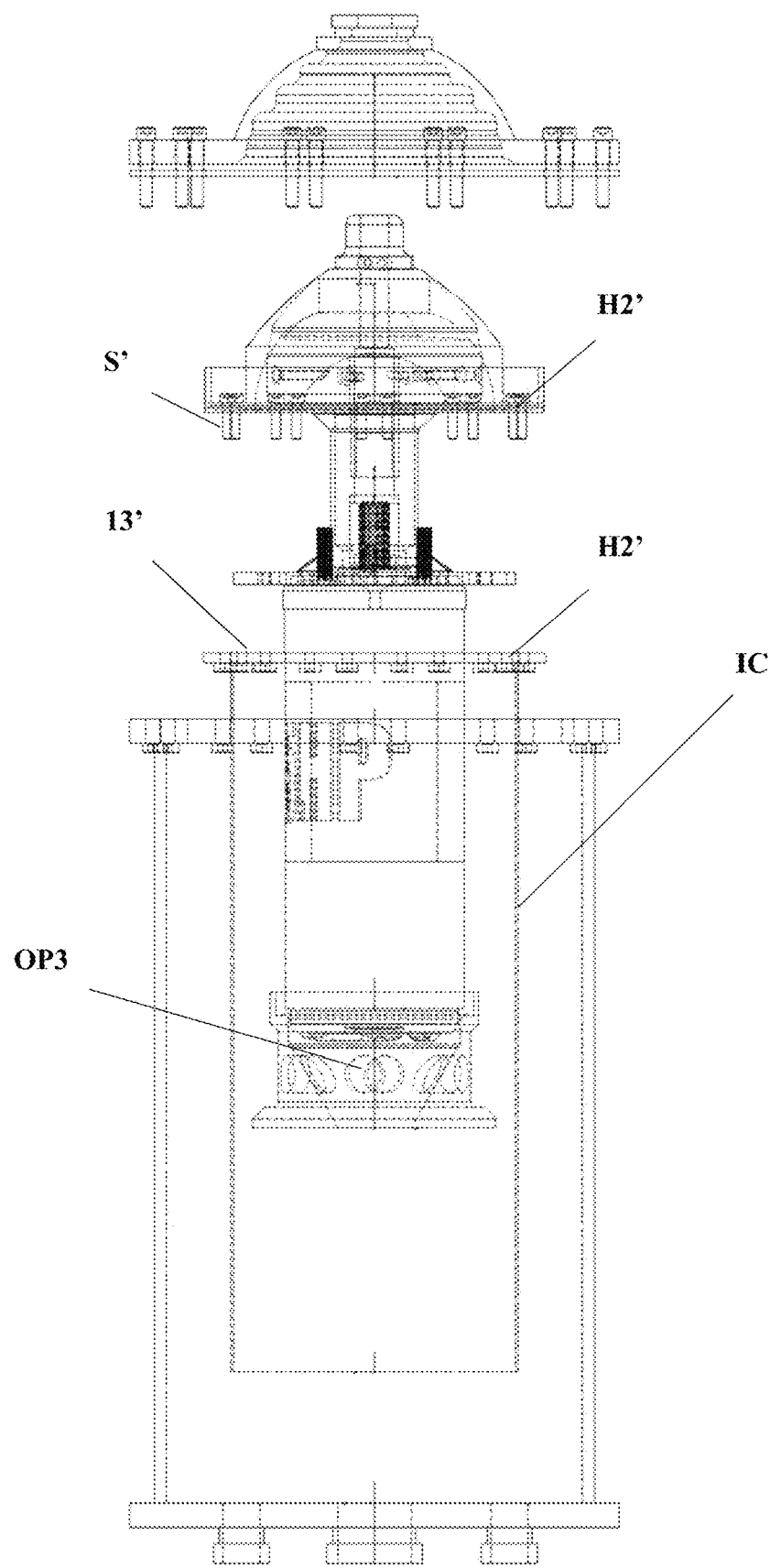
FIG. 34 shows another exploded view of the components of the substance separator system that is driven by a submersible actuator.
Figure 35:
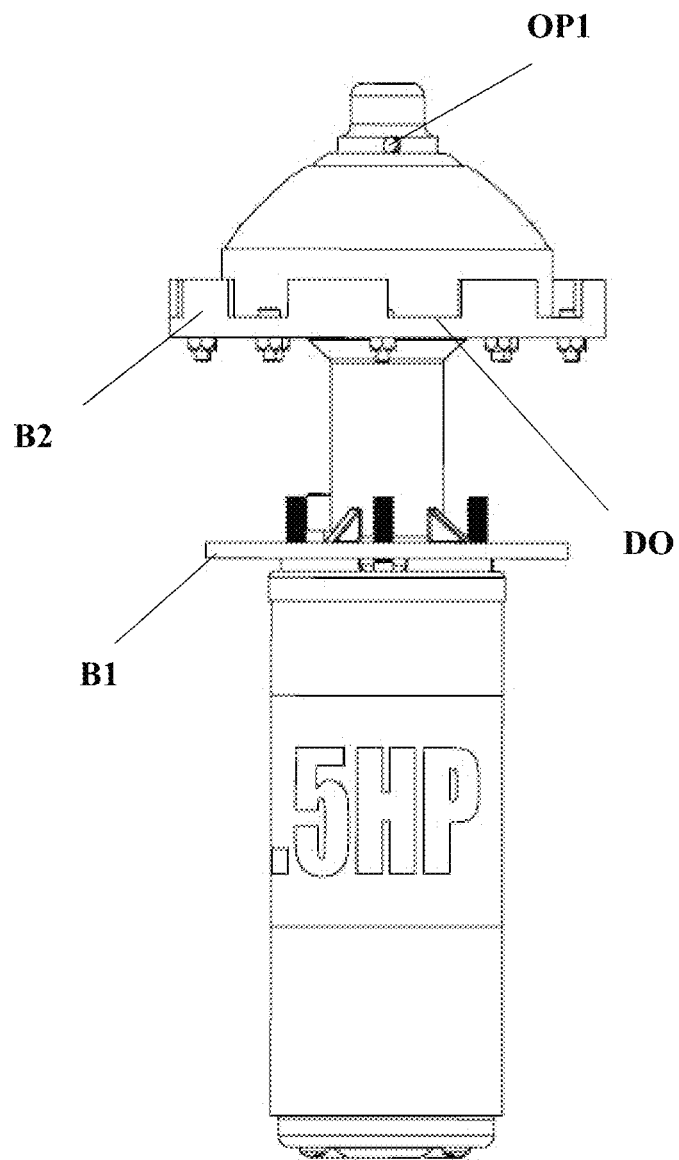
FIG. 35 shows some of the components of the substance separator system that is driven by a submersible actuator.
Figure 36:
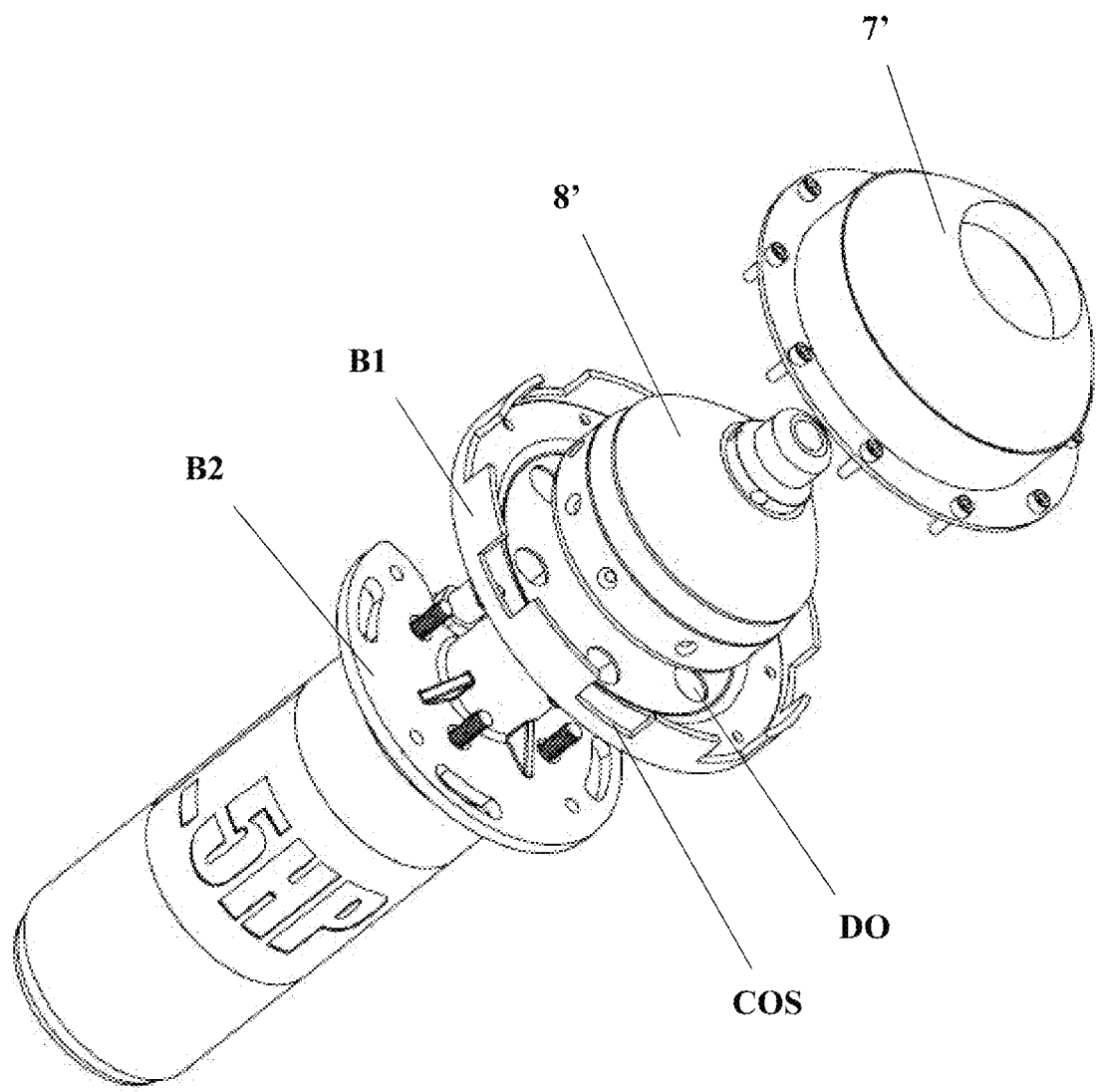
FIG. 36 shows an exploded view of some of the components of the substance separator system that is driven by a submersible actuator.
Figure 37:
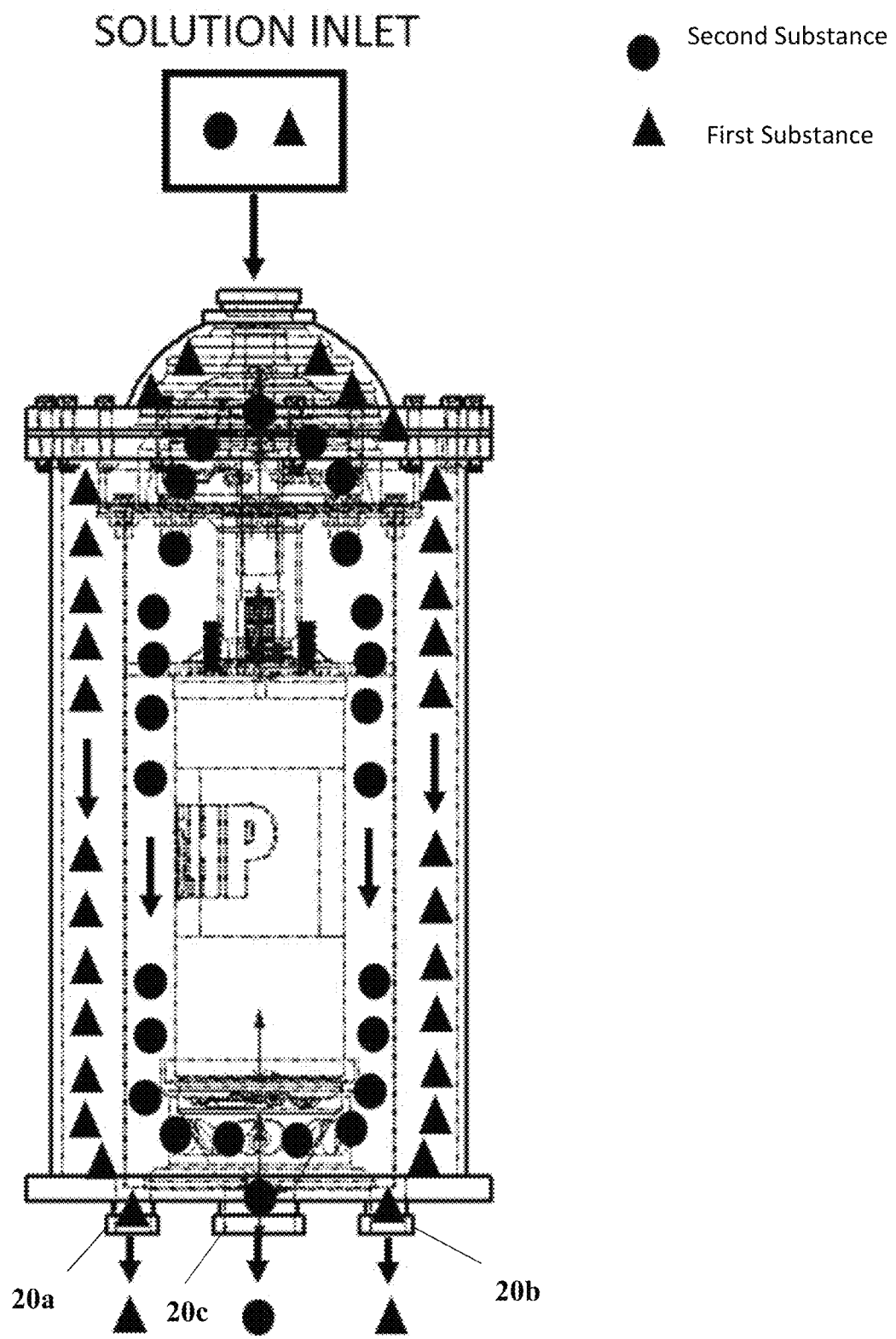
FIG. 37 shows the flow of substances within the substance separator that is driven by a submersible actuator.

As shown in FIG. 32-33, the disc stack separator 8' includes a mid-section MS (preferably having a dome shaped portion) configured to fit within the domed shaped portion DP2 of the upper cup 7'; and an extended portion EP that protrudes through the opening of the upper cup 7'. The extended portion EP is configured to receive the one or more substances from the solution inlet 6' and lead them into the interior of the disc stack separator 8' for separation. The extended portion EP also includes one or more openings OP1 configured to lead a first substance of the one or more substances into the upper cup 7'. Particularly, the centrifugal force created during operation of the disc stack separator 8' causes a first substance (referred to herein as "the first separated substance") to be released or discharged through the one or more openings OP1 into the area covered by the top cover plate 4' (i.e., the space between the top cover plate 4' and the upper cup 7'). Once in the area covered by the top cover plate 4', the first separated substance is led towards the top base B1 of middle cup 9', which in turn comprises cutout sections COS (as shown in FIGS. 35 and 36) configured to lead the first separated substance directly into the outer chamber OC, until it reaches the chamber outlets 20a and 20b corresponding to the outer chamber OC, as shown in FIG. 37

Moreover, as shown in FIGS. 32-33, a bottom portion of the mid-section MS of the disc stack separator 8' includes one or more openings OP2 configured to release a second substance of the one or more substances being separated into the interior chamber IC. Particularly, the centrifugal force created during operation of the disc stack separator 8' causes a second substance (referred to herein as "the second separated substance") to be released or discharged via the one or more openings OP2 into the upper cup 7'. Once inside the upper cup 7', the second separated substance is led towards the top base B1 of middle cup 9', which comprises one or more discharge orifices DO (as shown in FIG. 36) that are configured to lead the second separated substance directly into the interior chamber IC until it reaches the chamber outlet 20c corresponding to the interior chamber IC, as shown in FIG. 37. As the liquid comprising the second separated substance moves along the interior chamber IC it will also cool down the submersible actuator 10'. It should be noted that the discharge orifices DO may have a circular shape, as shown in FIGS. 35-36, but may have any other shape capable of leading the second separated substance into the interior chamber IC.

The disc stack separator 8' is actuated by the submersible actuator 10'. Actuation of the separator 8' is possible because the submersible actuator 10' includes a shaft 11' that is connected or coupled to the disc stack separator 8' via a shaft coupling unit SCU'. It should be noted that the shaft 11' is secured to a top end of the actuator 10' via a coupling unit 14'. When the actuator 10' is in operation, it causes the disc stack separator 8' (which is couple to the shaft 11') to vigorously spin or rotate, thereby create centrifugal forces within the stack separator 8'. It should be noted that the submersible actuator 10' may be a submersible electric motor or actuator EM; or a submersible pneumatic or hydraulic motor HM, as described for other embodiments of the invention. For embodiments having an electric motor or actuator EM, the substance separator system 50 also comprises at least one electric power connector on the top cover plate 4'. As previously noted, the horsepower of the submersible electric motor or actuator EM should preferably be between 0.3 HP and up to 300 HP. In some embodiments, however, the horsepower range may be higher or lower. For embodiments having a submersible pneumatic or hydraulic motor HM, the substance separator system 50 is connected to a pneumatic or hydraulic power source that provides power to the pneumatic or hydraulic motor HM via inputs on the bottom chamber flange 3', which in turn are connected to the submersible pneumatic or hydraulic motor HM.

The middle cup 9' includes a central hollow tube HT perpendicularly attached to a top base B1 and to a bottom base B2. The top base B1 provides support to the disc stack separator 8' and includes an opening configured to: 1) receive the shaft coupling unit SCU' from the disc stack separator 8'; and 2) to provide access to the shaft coupling unit SCU' into the hollow tube HT for subsequent coupling with the shaft 11'. The bottom base B2, on the other hand, includes an opening configured to: 1) receive the shaft 11'; and 2) to provide access to said shaft 11' into the hollow tube HT for subsequent coupling with the shaft coupling unit SCU'. Accordingly, the opening in the top base B1 and the bottom base B2 are configured to facilitate coupling between the shaft coupling unit SCU' and the shaft 11'.

Moreover, the top base B1 includes one or more holes H2' configured to align with the one more holes H2' of the flat portion FP2 of the upper cup 7' and with one or more holes H2' on the interior chamber flange 13' of the interior chamber IC. The one or more holes H2' on the top base B1, the flat portion FP2, and the interior chamber flange 13' are also configured to receive one or more bolts S' that connect the upper cup 7' to the top base B1 and to the interior chamber flange 13'. The bottom base B2 includes one or more holes configured to allow the second separated substance to reach the outlet 20c corresponding to the interior chamber IC. The bottom base B2 of the middle cup 9', on the other hand, is coupled or secured to a top end of the submersible actuator 10' via one or more bolts S'. The bottom end of the submersible actuator 10', in turn, is coupled or secured to the lower cup 12', which serves a base for the submersible actuator 10' and holds it in place within the interior chamber IC. It should be noted that the lower cup 12' is coupled or secured to the bottom of the interior chamber IC and that it is aligned with the chamber outlet 20c. Moreover, the lower cup 12' includes one or more openings OP3 configured to lead the second separated substance from the interior chamber IC into the chamber outlet 20c (which as noted corresponds to the interior chamber IC), thereby allowing said substance to exit the substance separator system 50. From the foregoing it is therefore apparent that securing the flat portion FP2 of the upper cup 7' to the top base B1 of the middle cup 9' and to the interior chamber flange 13' of the interior chamber IC, has the effect of enclosing the hollow tube HT, the bottom base B2, the submersible actuator 10' and the lower cup 12' within the interior chamber IC, thereby isolating these elements from the outer chamber OC.

Figure 39:
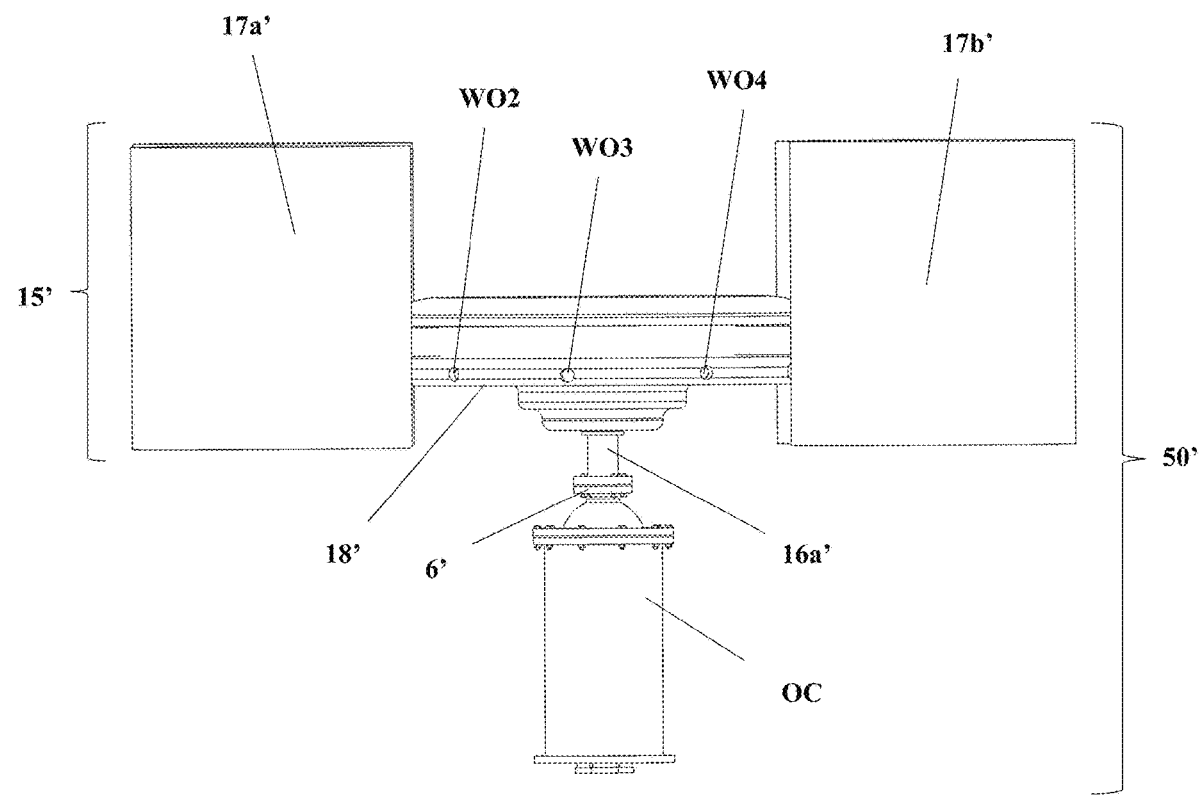
FIG. 39 shows some of the components of the alternate embodiment of the substance separator that is driven by a submersible actuator.
Figure 40:
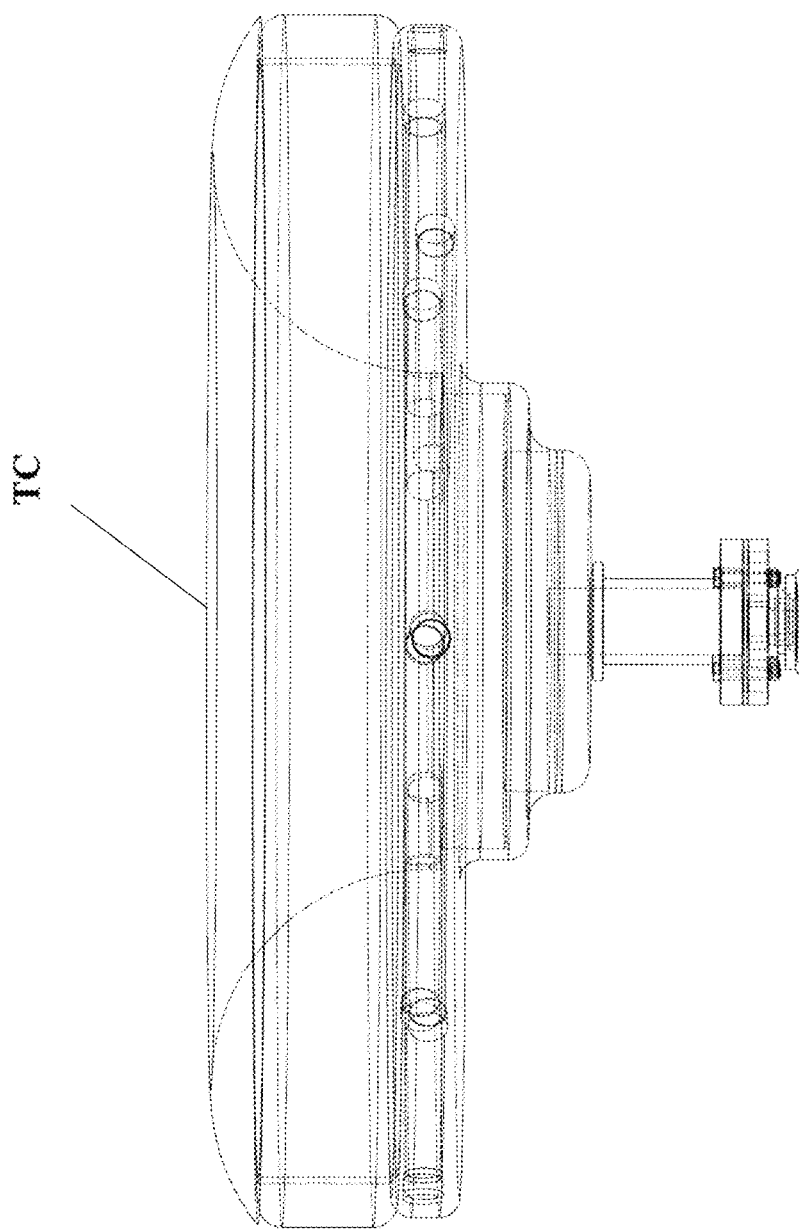
FIG. 40 shows an expanded view of a component of the alternate embodiment of the substance separator that is driven by a submersible actuator.
Figure 41:
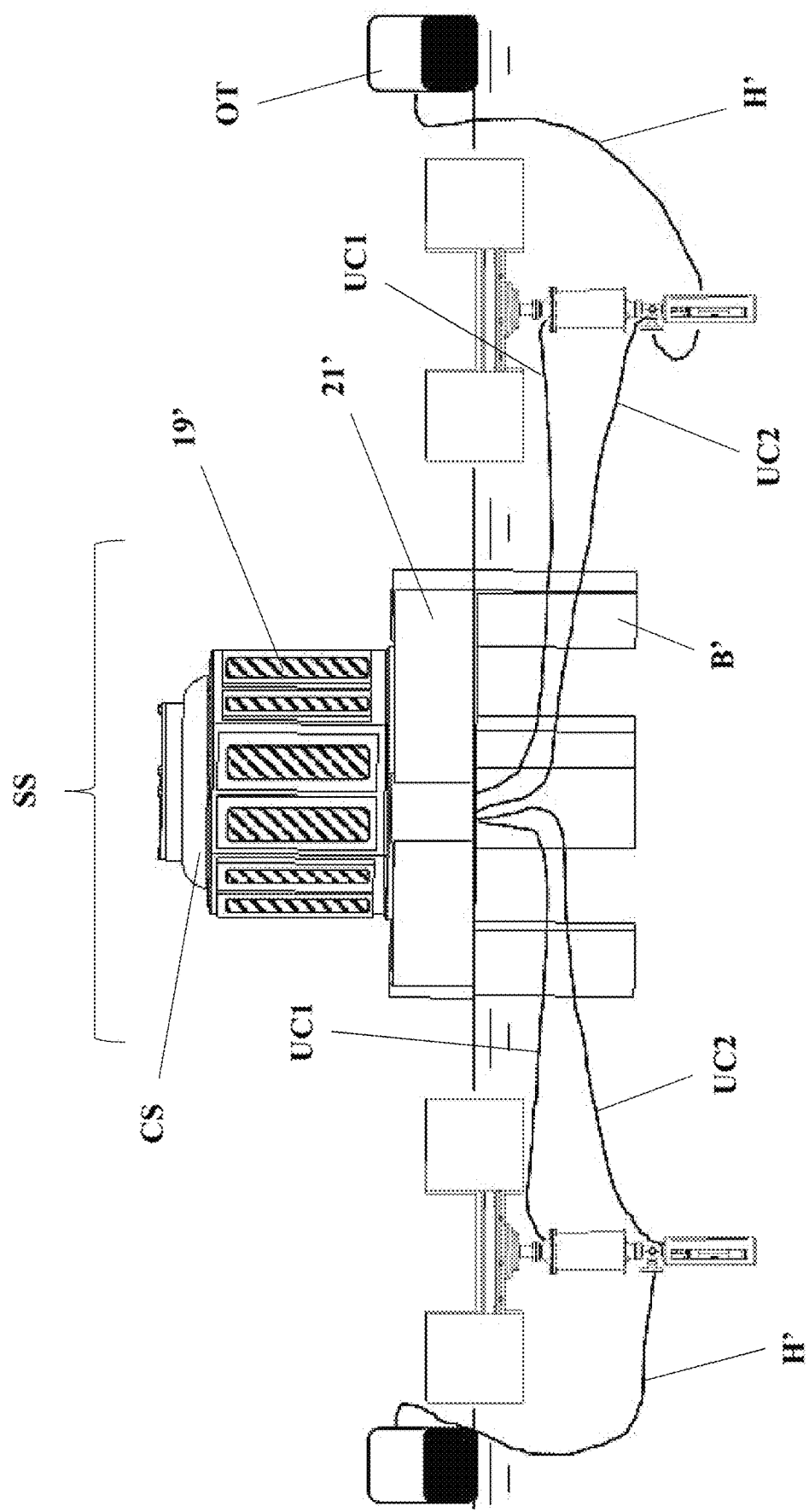
FIG. 41 shows the alternate embodiment of the substance separator interacting with a floating solar power station.
Figure 42:
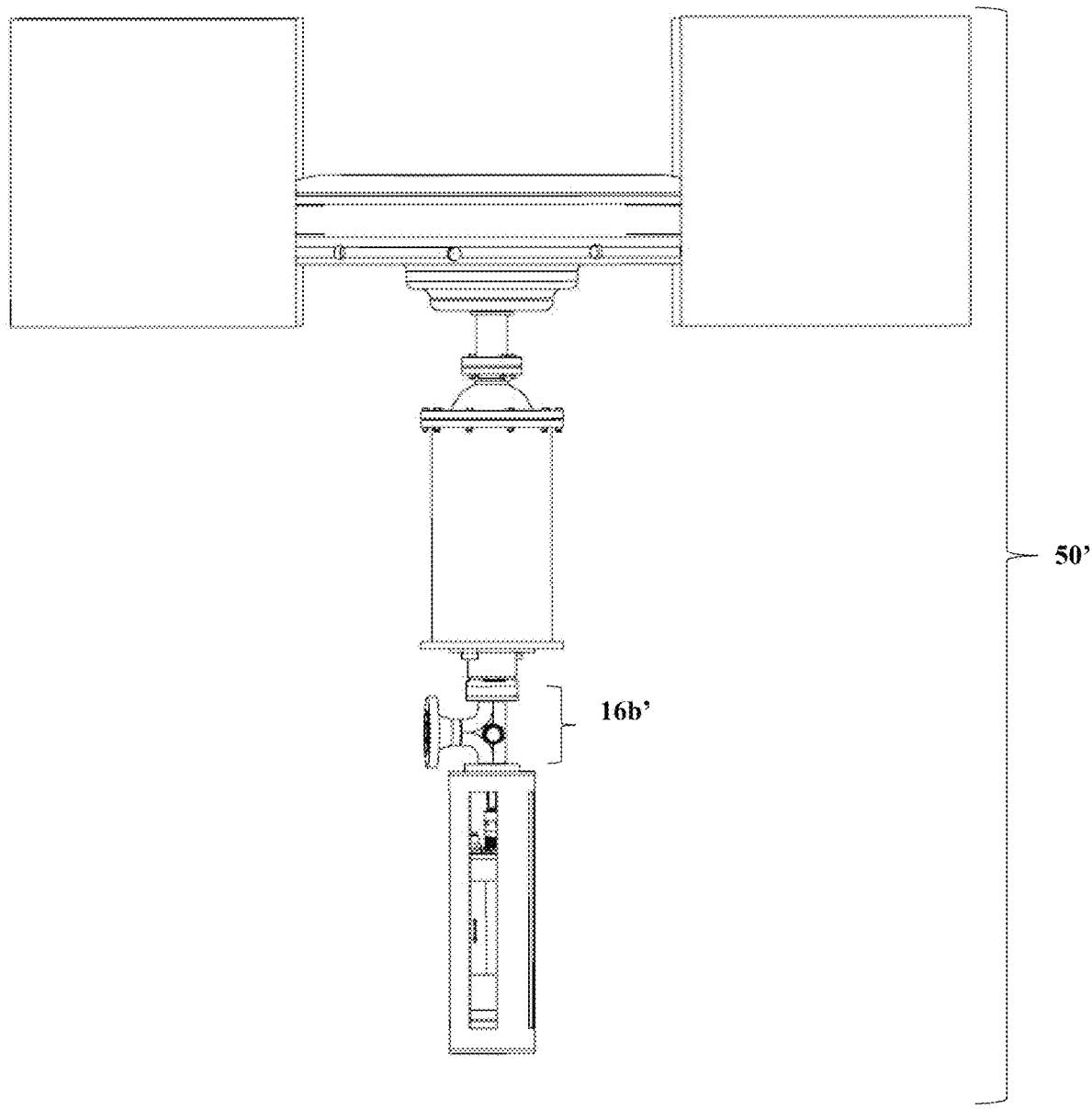
FIG. 42 shows the alternate embodiment of the substance separator that is driven by a submersible actuator.
Figure 43:
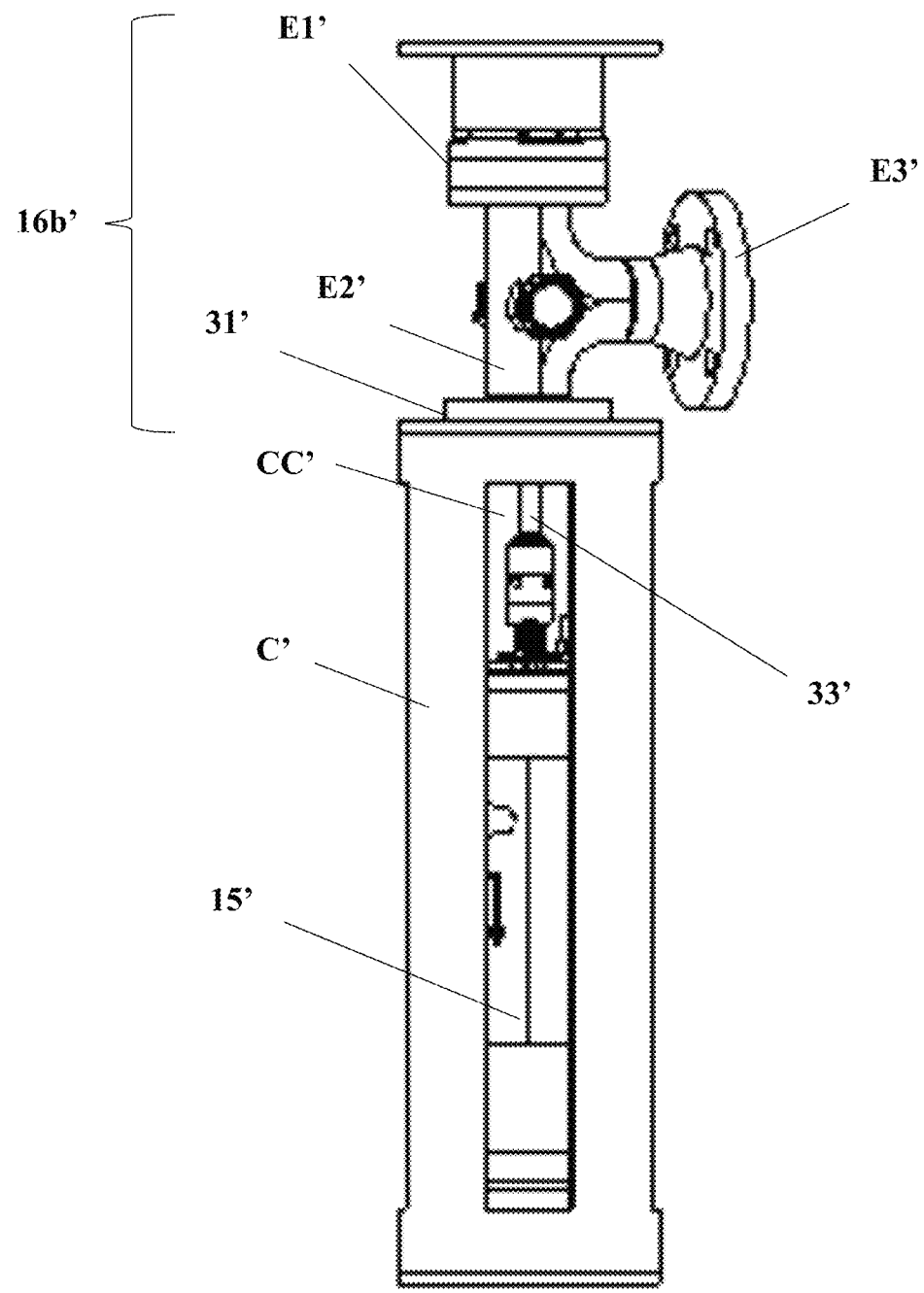
FIG. 43 shows an expanded view of a component of the alternate embodiment of the substance separator that is driven by a submersible actuator.
Figure 44:
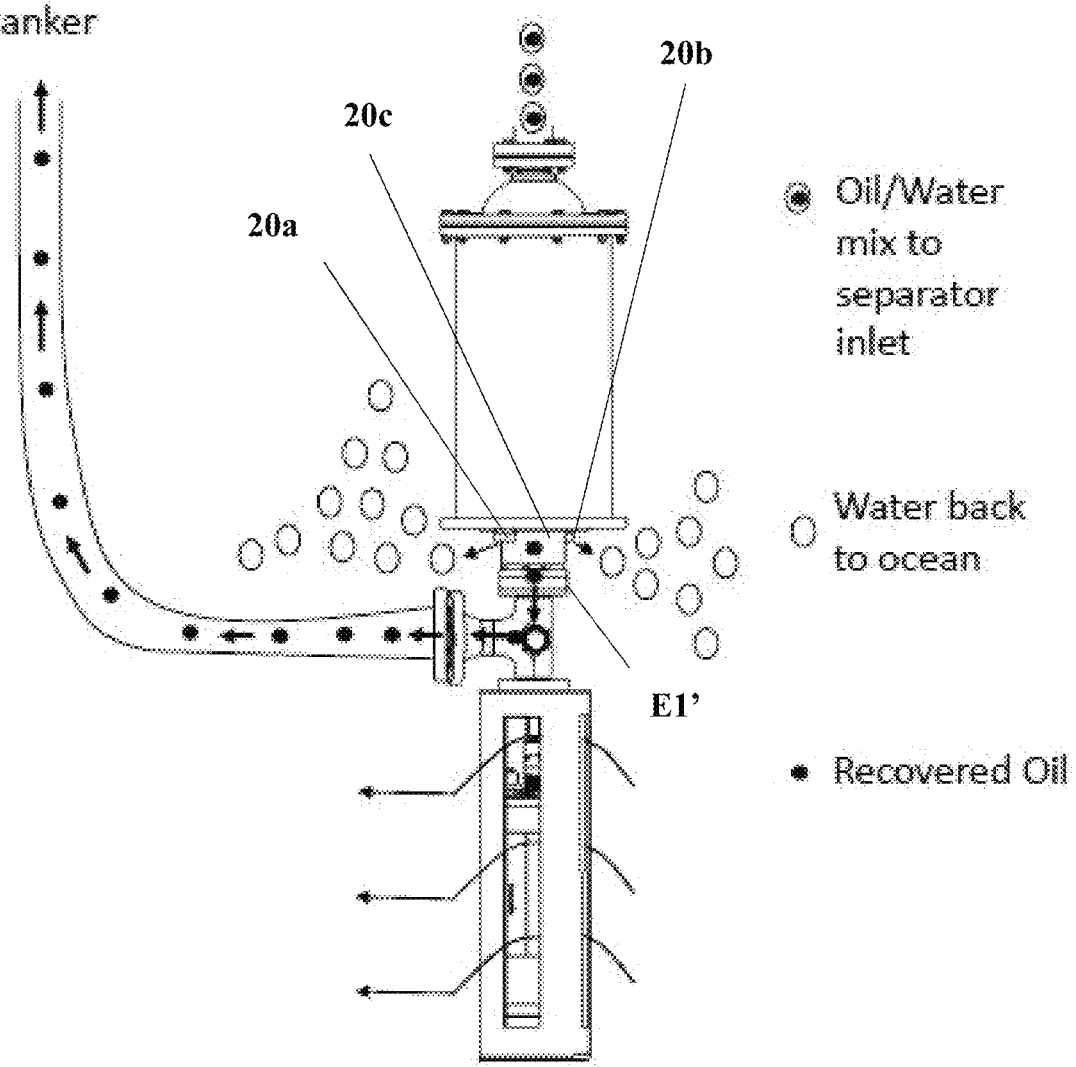
FIG. 44 shows the flow of substances once they have been released from the alternate embodiment of the substance separator that is driven by a submersible actuator.

As shown in FIGS. 38-44, the substance separator system 50 may be modified for oil spill recovery and cleanup applications. In an alternate embodiment, the alternate substance separator system 50' further comprises a floating oil collector 15' that works as a weir skimmer by removing oil from the surface of a body of water. The floating oil collector 15' is connected to the solution inlet 6' via a first interconnection inlet 16a'. It should be noted that the first interconnection inlet 16a' is connected to the solution inlet 6' via one or more screws, bolts or fasteners S'. The floating oil collector 15' comprises one or more floating devices or buoys 17a', 17b' and a canister 18' for collecting the mixture of oil and water from an oil spill, as shown in FIGS. 41 and 44. The oil collector 15' should be placed on the surface of the body of water where the oil spill has occurred. Once it is placed in the water, the oil collector 15' will be suspended therein with the help of the floating devices 17a', 17b'. As shown in FIG. 41, the canister 18' will be slightly beneath the surface in order to facilitate entry of the substances that from part of the oil spill into the oil collector 15'.

Figure 38:
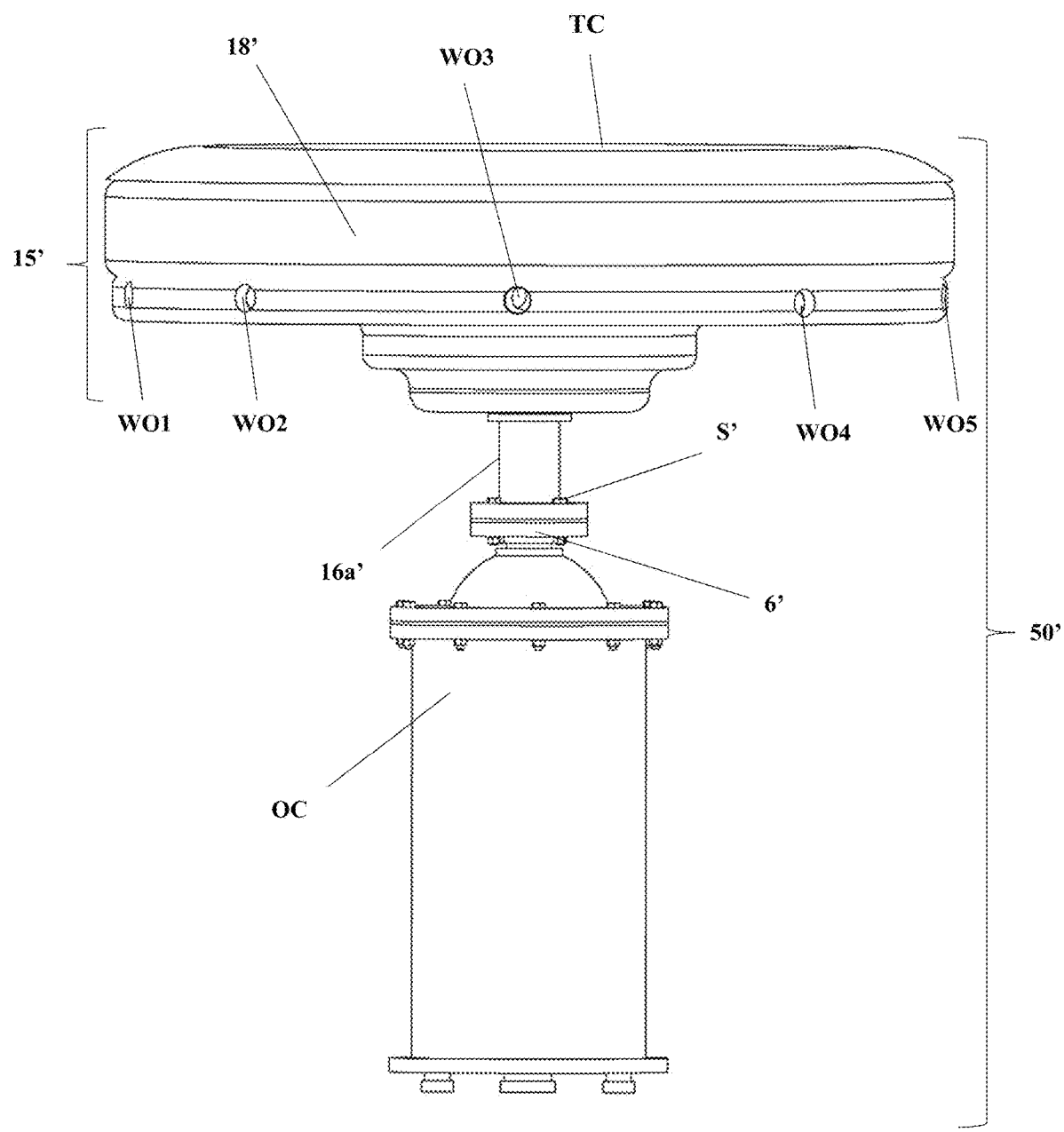
FIG. 38 shows some of the components of an alternate embodiment of the substance separator that is driven by a submersible actuator.

The substances that from part of the oil spill (i.e., oil and water) can enter the floating oil collector 15' through the top TC of the canister 18' or via one or more openings WO1-WO5 on the side of the canister 18' that are configured to lead the oil spill into the first interconnection inlet 16a', as shown in FIGS. 38-40. Once the substances comprising the oil spill enter the interconnection inlet 16', they are led to the solution inlet 6'. The solution inlet 6', in turn, leads the substances directly into the separator 8', which is the substances they will be separated in the same manner described for the first embodiment of the separator system 50. Once the substances have been separated, the separated oil will be released, via one of the chamber outlets 20c, to a tank or oil tanker OT on the water surface; whereas the separated water will be returned to the corresponding body of water via the remaining chamber outlets 20a, 20b that are not releasing oil, as further described below.

It should be noted that chamber outlet 20c in the alternate substance separator system 50' is connected to a second interconnection inlet 16b' that leads into a chamber C' that houses a submersible progressive cavity pump 33' that is coupled to a submersible actuator 15'. The chamber C' comprises at least one inlet 31' configured to interact with the second interconnection inlet 16b'. It should also be noted that the submersible actuator 15' is secured to the bottom of the chamber C'; and that the chamber C' has one or more openings CC' on its side configured to allow water (from the body of water the alternate separator system 50' is placed in) to enter the chamber C', thereby cooling down the submersible actuator 15' while it is in operation. The second interconnection inlet 16b', on the other hand, comprises a first end E1' configured to be coupled or attached to the chamber outlet 20c; a second end E2' configured to be coupled or attached to the inlet 31' on the chamber C' covering the progressive cavity pump 33'; and an outlet E3' perpendicularly attached to the body of the second interconnection inlet 16b', that is configured to be coupled or attached to a hose or tube H'. The submersible progressive cavity pump 33' is similar to and works in the manner described for the progressive cavity pump 33 described in the embodiment shown in FIGS. 27-30. In other words, the rotation of the rotor inside the progressive cavity pump 33' (which is powered/actuated by the submersible actuator 15') creates a vacuum that pulls the separated oil from the chamber outlet 20c interacting with the second interconnection inlet 16b' towards the outlet E3'. As previously noted, the outlet E3' is connected to the hose H', which is configured to lead the oil being pumped by the progressive cavity pump 33' into the oil tanker OT for disposal, as shown in FIG. 44. The separated water, on the other hand, will be returned to the corresponding body of water via the remaining chamber outlets 20a, 20b that are not interacting or connected to the first end E1' of the second interconnection inlet 16b', as shown in FIG. 44.

Figure 45:
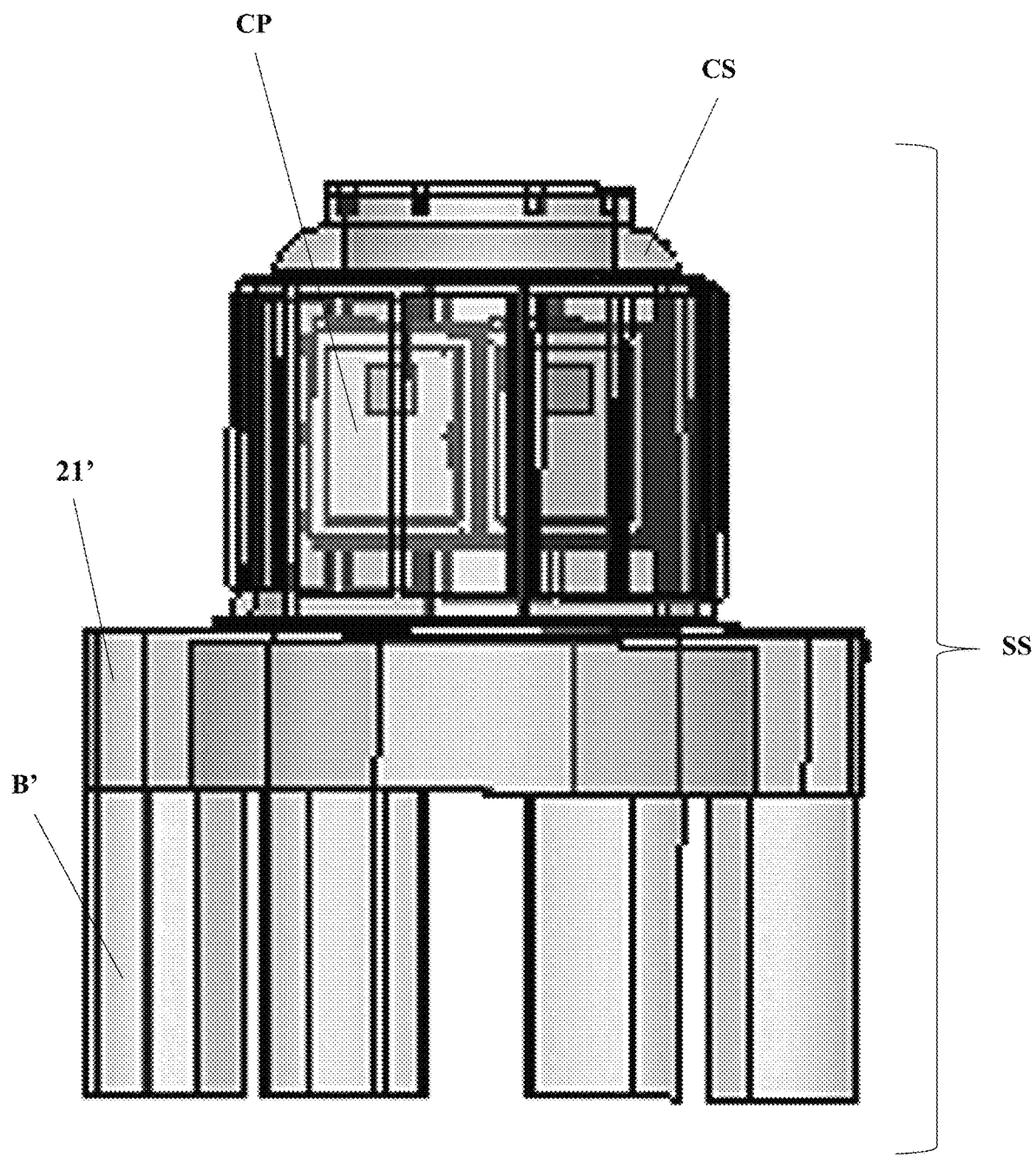
FIG. 45 shows the floating solar power station.

The alternate substance separator system 50' may also be powered via a floating solar power station SS, as shown in FIGS. 41 and 45. The solar power station SS comprises a floating base 21' with one or more floating devices or buoys B' configured to allow the station SS to float on the water; and one or more solar panels 19' coupled to the walls of the station SS. The solar panels 19' may be polycrystalline or monocrystalline. The station SS further comprises one or more underwater cables UC1, UC2 configured to transmit the power generated from the solar panels 19' to the alternate substance separator system 50', thereby providing power to it; and allowing the disc stack separator 8' and progressive cavity pump 33' to operate via solar energy. The one or more underwater cables UC1, UC2 transmit power from a control panel CP within a cabin CS in the station SS that is connected to the alternate substance separator system 50' via under water plugs. Particularly, cable UC1 transmits power to the separator 8', while cable UC2 transmits power to the progressive cavity pump 33'.

The station SS further comprises a monitoring system that monitors the amperage, voltage generated from the solar panels 19', and the revolutions per minute exerted by the submersible actuator 15'. The more solar panels included on the station SS, more alternate substance separator systems 50' can be powered and therefore, used to clean up an oil spill. Lastly, it should be noted that the control panel CP comprises a DC or AC circuit breaker; a combiner box for combing several solar panels into a common bus; a surge arrestor for limiting the voltage on the components used in the station SS; a Sine wave filter to protect against excessive voltage spikes and overheating; and a battery pack.

In summary of the previous sections, the disclosure presented here is structurally innovative, presents advantages not available at the moment with blending system, complies with all new patent application requirements and is hereby lawfully submitted to the patent bureau for review and the granting of the commensurate patent rights.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:
1. A substance separator system, comprising:
   an outer chamber having a first distal end and a second distal end, wherein each distal end is opposite to each other;
   wherein the first distal end of the outer chamber includes a top chamber flange;
   wherein the second distal end of the outer chamber includes a bottom end having a plurality of chamber outlets;
   a top cover plate connected to or secured to the top chamber flange on the first distal end of the outer chamber;
   an upper cup;
   a disc stack separator;
   a middle cup;
   a submersible actuator;
   a lower cup;
   an interior chamber within the outer chamber;

wherein a first chamber outlet from the plurality of chamber outlets corresponds to the outer chamber, and a second chamber outlet from the plurality of chamber outlets corresponds to the interior chamber;

wherein the top cover plate includes a solution inlet that is configured to receive a mixture of substances and to lead them into the disc stack separator;

wherein the top cover plate is configured to fit over and enclose the upper cup;

wherein the upper cup is configured to fit over and enclose at least a portion of the disc stack separator;

wherein the disc stack separator includes an extended portion, a mid-section and a shaft coupling unit, and is configured to receive the one or more substances from the solution inlet;

wherein the upper cup includes an opening that is configured to receive and accommodate the extended portion of the disc stack separator;

wherein the extended portion includes one or more openings configured to release, in response to centrifugal forces within the disc stack separator, a first substance separated from the mixture of substances into the area covered by the top cover plate and subsequently into the outer chamber until the first substance reaches the first chamber outlet, which is where the first separated substance exits the outer chamber;

wherein the mid-section of the disc stack separator includes one or more openings configured to release, in response to centrifugal forces within the disc stack separator, a second substance separated from the mixture of substances into the upper cup and subsequently towards the interior chamber until the second substance reaches the second chamber outlet, which is where the second separated substance exits the interior chamber;

wherein the submersible actuator includes a top end, a bottom end and a shaft that is coupled to the disc stack separator via a shaft coupling unit;

wherein the middle cup includes a central hollow tube perpendicularly attached to a top base and to a bottom base;

wherein the top base and the bottom base each include an opening configured to facilitate coupling between the shaft coupling unit and the shaft;

wherein the bottom base of the middle cup is coupled or secured to the top end of the submersible actuator; and wherein the bottom end of the submersible actuator, in turn, is coupled or secured to the lower cup, which serves a base for the submersible actuator and holds it in place within the interior chamber.

2. The substance separator system of claim 1, wherein the top chamber flange includes one or more holes configured to receive one or more bolts, screws or fasteners.

3. The substance separator system of claim 1, further comprising a gasket located between the top cover plate and the top chamber flange.

4. The substance separator system of claim 3, wherein each of the top cover plate, gasket and top chamber flange includes one or more holes that align with each other and are configured to receive the one or more screws.

5. The substance separator system of claim 1, wherein the top cover plate includes a dome shaped portion and a flat portion.

6. The substance separator system of claim 5, wherein the top cover plate includes one or more holes on the flat portion that are configured to receive one or more bolts to secure the top cover plate to the top chamber flange.

7. The substance separator system of claim 1, wherein the upper cup includes a domed shaped portion and a flat portion.

8. The substance separator system of claim 7, wherein the opening configured to receive and accommodate the extended portion of the disc stack separator is located on the domed shaped portion.

9. The substance separator system of claim 7, wherein the upper cup includes one or more holes on the flat portion that are configured to receive one or more bolts to secure the upper cup to the top base of the middle cup and to the inner cup.

10. The substance separator system of claim 1, wherein the lower cup includes one or more openings configured to lead the second separated substance from the interior chamber into the second chamber outlet.

11. The substance separator system of claim 7, wherein the top base includes one or more holes configured to align with one more holes on the flat portion of the upper cup and with one or more holes on an interior chamber flange of the interior chamber.

12. The substance separator system of claim 11, wherein the one or more holes on the top base, the flat portion, and the interior chamber flange are also configured to receive one or more bolts that connect the upper cup to the top base and to the interior chamber flange.

13. The substance separator system of claim 1, wherein bottom base includes one or more holes configured to allow the second separated substance to reach the second chamber outlet.

14. The substance separator system of claim 1, wherein the lower cup is aligned with the second chamber outlet.

15. The substance separator system of claim 1, wherein the lower cup includes one or more openings configured to lead the second separated substance into the second chamber outlet.

16. The substance separator system of claim 1, further comprising a floating oil collector for removing oil from the surface of a body of water, wherein said floating oil collector includes one or more floating devices and a canister.

17. The substance separator system of claim 16, wherein the floating oil collector is connected to the solution inlet via a first interconnection inlet.

18. The substance separator system of claim 16, wherein the canister includes one or more openings that are configured to lead the mixture of substances into the first interconnection inlet, which in turn leads the mixture of substances to the separator via the solution inlet.

19. The substance separator system of claim 18, further comprising a second interconnection inlet having a first end configured to interact with the second chamber outlet.

20. The substance separator system of claim 19, further comprising a chamber having at least one inlet, wherein said chamber houses a submersible progressive cavity pump that is coupled to a second submersible actuator, and wherein the at least one inlet is configured to interact with a second end of the second interconnection inlet.

21. The substance separator system of claim 20, wherein the second interconnection inlet includes an outlet that is configured to be attached to a hose or tube.

22. The substance separator system of claim 21, wherein the first separated substance is released via the one or more at least one chamber outlet from the plurality of chamber outlets that are not interacting with the second interconnection inlet.

23. The substance separator system of claim 21, wherein the progressive cavity pump is configured to create a vacuum that pulls the second separated substance from the second chamber outlet interacting with the second interconnection inlet towards the outlet.

24. The substance separator system of claim 23, wherein the second separated substance is led into a tank via the hose or tube.

25. The substance separator system of claim 24, wherein the second separated substance is oil.

26. The substance separator system of claim 22, wherein the first separated substance is water.

27. The substance separator system of claim 24, wherein the disc stack separator and the progressive cavity pump are powered by the energy generated by one or more solar panels.

28. The substance separator system of claim 27, wherein the one or more solar panels are located in a floating solar power station comprising one or more floating devices.

29. The substance separator system of claim 27, wherein the energy generated by the one or more solar panels is transmitted via one or more underwater cables.

* * * * *